(12) United States Patent
Hu

(10) Patent No.: US 10,121,104 B1
(45) Date of Patent: Nov. 6, 2018

(54) SYSTEM AND METHOD FOR ANOMALY DETECTION VIA A MULTI-PREDICTION-MODEL ARCHITECTURE

(71) Applicant: Aivitae LLC, Redwood City, CA (US)

(72) Inventor: Bob Hu, Los Altos Hills, CA (US)

(73) Assignee: AIVITAE LLC, Redwood City, CA (US)

( * ) Notice: Subject to any disclaimer, the term of this patent is extended or adjusted under 35 U.S.C. 154(b) by 0 days.

(21) Appl. No.: 16/029,747

(22) Filed: Jul. 9, 2018

Related U.S. Application Data

(63) Continuation of application No. 16/011,136, filed on Jun. 18, 2018.

(60) Provisional application No. 62/587,738, filed on Nov. 17, 2017.

(51) Int. Cl.
*G06N 3/08* (2006.01)
*G06N 3/04* (2006.01)

(52) U.S. Cl.
CPC .......... *G06N 3/084* (2013.01); *G06N 3/0454* (2013.01)

(58) Field of Classification Search
CPC ............ G06F 11/1476; G06N 3/0454; G06N 3/08–3/088

USPC .......................................................... 714/26
See application file for complete search history.

(56) References Cited

U.S. PATENT DOCUMENTS

| 2017/0169357 | A1* | 6/2017 | Caspi | G06N 99/005 |
| 2017/0330068 | A1* | 11/2017 | Yu | G06K 9/6274 |
| 2018/0197317 | A1* | 7/2018 | Cheng | G06T 11/008 |

* cited by examiner

*Primary Examiner* — Joseph R Kudirka
(74) *Attorney, Agent, or Firm* — Pillsbury Winthrop Shaw Pittman LLP

(57) ABSTRACT

In some embodiments, anomaly detection may be facilitated via a multi-neural-network architecture. In some embodiments, a first neural network may be configured to generate hidden representations of data items corresponding to a concept. A second neural network may be configured to generate reconstructions of the data items from the hidden representations. The first neural network may be configured to assess the reconstructions against the data items and update configurations of the first neural network based on the assessment of the reconstructions. Subsequent to the update of the first neural network, the first neural network may generate a hidden representation of a first data item from the first data item. The second neural network may generate a reconstruction of the first data item from the hidden representation. An anomaly in the first data item may be detected based on differences between the first data item and the reconstruction.

20 Claims, 13 Drawing Sheets

SYSTEM AND METHOD FOR ANOMALY DETECTION VIA A MULTI-PREDICTION-MODEL ARCHITECTURE

RELATED APPLICATIONS

This application is a continuation of U.S. patent application Ser. No. 16/011,136, filed on Jun. 18, 2018, entitled "SYSTEM AND METHOD FOR ANOMALY DETECTION VIA A MULTI-PREDICTION-MODEL ARCHITECTURE," which claims the benefit of U.S. Provisional Application No. 62/587,738, filed on Nov. 17, 2017, entitled "System and Method for Detection of Anomaly," both of which are hereby incorporated by reference herein in their entirety.

FIELD OF THE INVENTION

The invention relates to recognition or detection of concepts or anomalies, including, for example, detection of anomalies via one or more neural networks or other prediction models.

BACKGROUND OF THE INVENTION

In recent years, the field of artificial intelligence and machine learning has experienced a resurgence due to advances in performance of computer hardware, sizes of training sets, theoretical understanding of artificial intelligence, and other advances. This resurgence has enabled many advances in other technical fields, including recognition or other prediction systems. Existing machine learning systems can classify data, such as x-rays images, magnetic resonance images, volumetric scans (e.g., CT scans), or other data for diagnostic purposes. Such machine learning systems generally rely on the presentation of known anomalies through labels. For example, the classification of retinal pathologies depends on presenting the learning system with millions of images corresponding to known pathologies and helping the learning system classify each of the images as corresponding to one of the known pathologies. When presented with an image corresponding to an unknown pathology, however, the learning system would classify the image as corresponding to one of the known pathologies even where the image does not match any of the known pathologies. These and other drawbacks exist.

SUMMARY OF THE INVENTION

Aspects of the invention relate to methods, apparatuses, and/or systems for facilitating recognition or detection of concepts or anomalies via neural networks or other prediction models.

In some embodiments, one prediction model may be trained to map data items of a training data set (e.g., a "normal" set of data with respect to a given concept) into a randomly distributed latent vector space, and another prediction model may be trained to generate output data resembling data items of the training data set (e.g., from inputs of latent vectors of the vector space). In some embodiments, the two prediction models may be arranged in a prediction model architecture in which (i) a data item is provided as input to the prediction model that converts the data item to a latent vector, (ii) the latent vector is provided as input to the prediction model that generates a reconstruction of the data item based on the latent vector such that the reconstruction resembles the original data item. It should be noted that the foregoing architecture's arrangement of prediction models is not a typical auto-encoder that generates a reconstruction having every detail of the input data item. As an example, the foregoing architecture is configured to produce data items from a "normal" set that matches closely to the input data during the training process.

In some embodiments, a first prediction model may be configured to generate a hidden representation of a data item, and a second prediction model may be configured to generate a reconstruction of a data item based on a hidden representation of the data item. In some embodiments, the first prediction model is configured to update its configurations based on a reconstruction of a data item that is generated by the second prediction model with the goal of generating a hidden representation of the data item that the second prediction model can use to generate a better reconstruction that is more similar to the data item. When properly trained with respect to a collection of data items that correspond to the same concept (e.g., healthy brain, brain with tumors, healthy heart, diseased heart with certain condition, cat, dog, or other concept), the combination of the first and second prediction models is configured to generate reconstructions that are very similar to the corresponding input data items. When an data item is provided and does not correspond to the concept(s) (on which the combination of the first and second prediction models was trained), the model combination may attempt to generate a reconstruction of the data item, but the reconstruction will likely have sufficient differences from the data item given that the model combination is biased toward generating reconstructions that are similar to the data items corresponding to the concept(s) of the known training set. Such differences may be used to detect that an anomaly exists in the data item.

In some embodiments, a third prediction model may be configured to indicate (i) similarities or differences between two or more data items (e.g., the input data item and its corresponding reconstruction), (ii) whether two data items are similar or different (e.g., whether certain characteristics of the two data items are within one or more threshold ranges, such as thresholds learned via training or predefined manually), (iii) whether an anomaly exists in a data item (e.g., based on the third prediction model's assessment of the data item and its reconstruction(s) with one another), (iv) whether a data item has a classification (or concept) corresponding to the "normal" of the training set, or (v) other information.

In some embodiments, the third prediction model may be trained to minimize network bias to optimize detection of anomalies (e.g., including small abnormalities). In some embodiments, a collection of data items corresponding to the same concept(s) (e.g., on which the first and second prediction models are trained) may be obtained and provided to the combination of the first and second prediction models to cause the combination to generate reconstructions of the corresponding input data items. Each of the data items and its corresponding reconstruction may be provided to the third prediction model to train the third prediction model to recognize each of the corresponding pairs of data item and its reconstruction as similar (e.g., indicating no anomaly with respect to the trained "normal"). As an example, with respect to each of the corresponding pairs, feedback may be provided to the third prediction model that the third prediction model uses as a reference to assess its predictions of whether or how the data input and its reconstruction is similar or different. Based on its assessment, the third prediction model may update one or more of its configurations. The feedback may, for example, indicate that each data item of the collection and its reconstruction are similar or that no anomaly exists. In some embodiments, as compared to conventional statistical techniques (e.g., which requires a programmer to manually adjust the similarity thresholds), the third prediction model is configured to automatically adjust how much weight (if any) is to be given to certain similarities and differences. In this way, for example, the third prediction model produces more accurate results (e.g., by accounting for the network bias via the foregoing training).

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
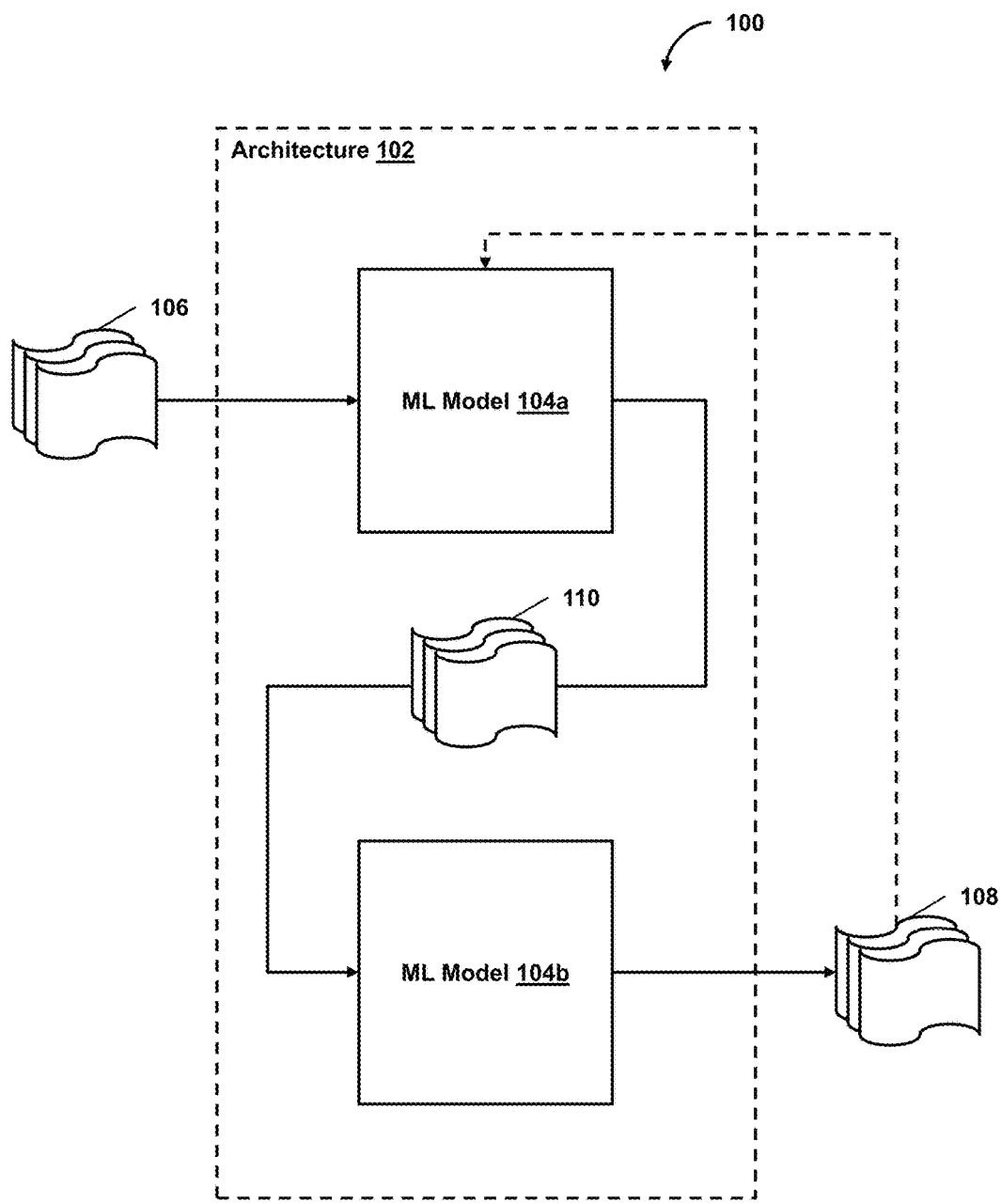
FIGS. 1A-1B shows a system for facilitating recognition or detection of concepts or anomalies via neural networks or other prediction models, in accordance with one or more embodiments.

FIG. 1 shows a system 100 for facilitating recognition or detection of concepts or anomalies via neural networks or other prediction models, in accordance with one or more embodiments. As shown in FIG. 1, system 100 may include architecture 102 in which a machine learning model (e.g., ML model 104*a*) takes data 106 as input, a machine learning model (e.g., ML model 104*b*) provides data 108 as output, and the output of a first machine learning model (e.g., data 110) is provided as input to a second machine learning model. As indicated in FIG. 1A, in some embodiments, the output of the second machine learning model (e.g., ML model 104*b*) may be provided as input to the first machine learning model (e.g., ML model 104*a*). As an example, data 108 generated by ML model 104*b* may automatically be provided as reference feedback to ML model 104*a*, and ML model 104*a* may use the feedback to update one or more of its configurations (e.g., one or more layers of ML model 104*a*, one or more weights or other parameters of ML model 104*a*, etc.). Thus, in some embodiments, one or more machine learning models of architecture 102 may be automatically trained in accordance with the foregoing fashion without the need for human intervention. It should be noted that, although embodiments herein are described with respect to multiple models (e.g., multiple neural networks, machine learning models, etc.), such multiple models may in some embodiments be sub-models/networks within a larger model/network (e.g., a network that includes multiple neural networks, a model that includes multiple sub-models, etc.). In some embodiments, when a data item (e.g., an audio, image, video, sensor data recording, or other data item) captured by one or more sensors (e.g., camera, microphone, accelerometer, or other sensor) is received by architecture 102, the components of architecture 102 process the data item to (i) facilitate recognition or detection of a concept or anomaly with respect to the data item, (ii) reconstruct a version of the data item, (iii) determine similarities or differences (e.g., between the data item and its corresponding reconstruction) or other information regarding the data item, or (iv) perform other operations.

Figure 1B:
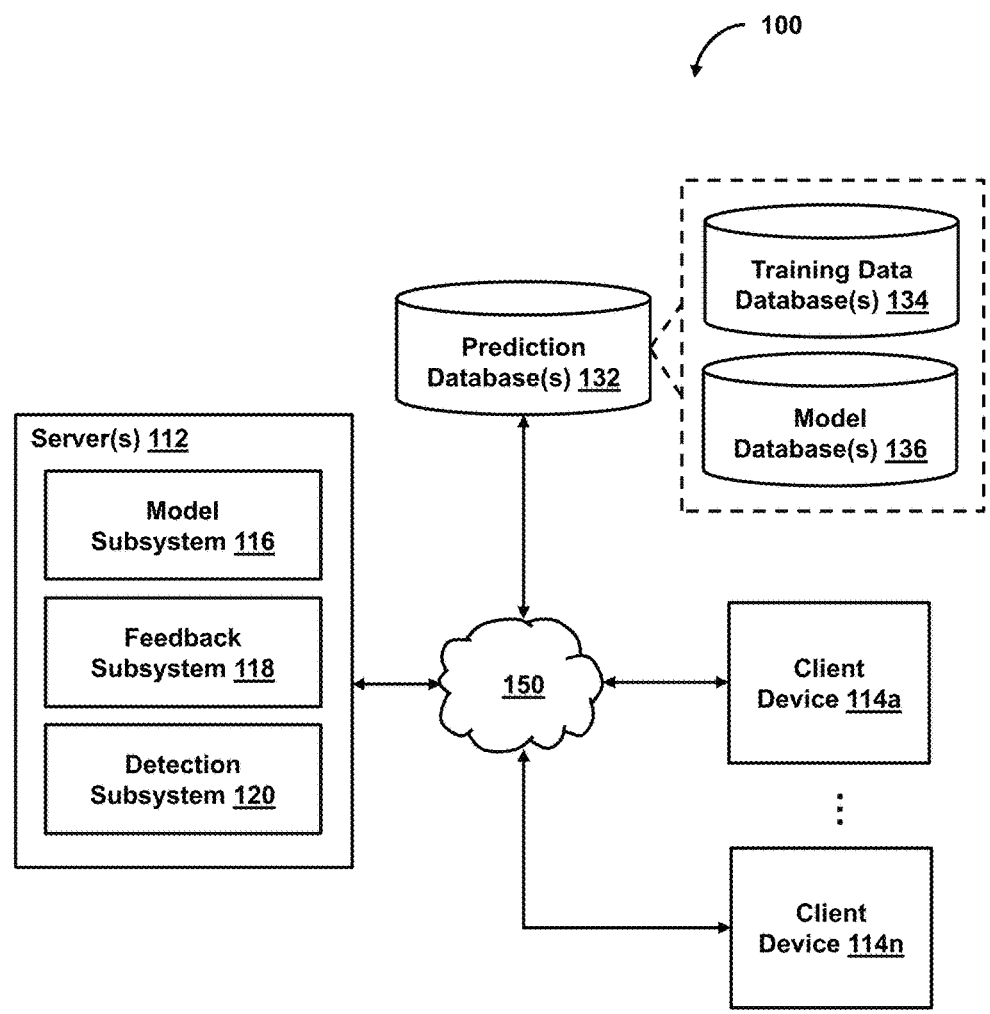

As shown in FIG. 1B, system 100 may include server(s) 112, client device 114 (or client devices 114*a*-114*n*), or other components. Server 112 may include model subsystem 116, feedback subsystem 118, detection subsystem 120, or other components. Each client device 114 may include any type of mobile terminal, fixed terminal, or other device. By way of example, client device 114 may include a desktop computer, a notebook computer, a tablet computer, a smartphone, a wearable device, or other client device. Users may, for instance, utilize one or more client devices 114 to interact with one another, one or more servers, or other components of system 100. It should be noted that, while one or more operations are described herein as being performed by particular components of server 112, those operations may, in some embodiments, be performed by other components of server 112 or other components of system 100. As an example, while one or more operations are described herein as being performed by components of server 112, those operations may, in some embodiments, be performed by components of client device 114. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, existing machine learning systems can classify data for diagnostic purposes. Such machine learning systems generally rely on the presentation of known anomalies through labels. For example, the classification of retinal pathologies depends on presenting the learning system with millions of images corresponding to known pathologies and helping the learning system classify each of the images as corresponding to one of the known pathologies. When presented with an image corresponding to an unknown pathology, however, the learning system would classify the image as corresponding to one of the known pathologies even where the image does not match any of the known pathologies. For example, such learning systems will provide probabilistic odds as output to estimate the likelihood that the presented image belongs to one or more known classifications. This, however, assumes that all possible outcomes are already known. In one use case, for instance, a network trained to recognize dogs and cats would recognize a zebra as possibly 60% dog and 40% cat but would not output an unknown class. In another use case, because lung cancers can develop anywhere in the lungs and not be subject to any particular size, location or shape, the detection of lung cancer is a challenging problem. It is therefore practically impossible to enumerate and train a learning system on a training set that exhaustively covers all possible scenarios of lung cancer.

In some embodiments, system 100 may use one or more prediction models to facilitate recognition or detection of concepts and anomalies or perform other operations. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibiting in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, one prediction model may be trained to map data items of a training data set (e.g., a "normal" set of data with respect to a given concept) into a randomly distributed latent vector space, and another prediction model may be trained to generate output data resembling data items of the training data set (e.g., from inputs of latent vectors of the vector space). In some embodiments, the two prediction models may be arranged in a prediction model architecture in which (i) a data item is provided as input to the prediction model that converts the data item to a latent vector, (ii) the latent vector is provided as input to the prediction model that generates a reconstruction of the data item based on the latent vector such that the reconstruction resembles the original data item. It should be noted that the foregoing architecture's arrangement of prediction models is not a typical auto-encoder that generates a reconstruction having every detail of the input data item. As an example, the foregoing architecture is configured to produce data items from a "normal" set that matches closely to the input data during the training process.

In some embodiments, a first prediction model (e.g., ML model 104*a*) may be configured to generate a hidden representation of a data item, and a second prediction model may be configured to generate a reconstruction of a data item based on a hidden representation of the data item. As an example, a data item may include a document, an audio (e.g., ultrasound or other audio recording), an image (e.g., volumetric scan, ultrasound image, magnetic resonance image (MRI), x-ray image, etc.), a video (e.g., ultrasound video, MRI video, etc.), a sensor data recording, or other data item. Sensor data recordings may, for example, include recordings of medical sensor signals, such as magnetic field signals, radio frequency (RF) signals, electroencephalogram (EEG) signals, electrocardiogram (ECG) signals, electromyogram (EMG) signals, mechanomyogram (MMG) signals, electrooculography (EOG) signals, magnetoencephalogram (MEGA) signals, or other signals. A hidden representation of a data item may include a compressed representation (e.g., lossy, lossless, etc.) of the data item, other representation having a reduced resource size than the data item, or other hidden representation.

In some embodiments, the first prediction model is configured to update its configurations based on a reconstruction of a data item that is generated by the second prediction model with the goal of generating a hidden representation of the data item that the second prediction model can use to generate a better reconstruction that is more similar to the data item. When properly trained with respect to a collection of data items that correspond to the same concept (e.g., healthy brain, brain with tumors, healthy heart, diseased heart with certain condition, cat, dog, or other concept), the combination of the first and second prediction models is configured to generate reconstructions that are very similar to the corresponding input data items. When an data item is provided and does not correspond to the concept(s) (on which the combination of the first and second prediction models was trained), the model combination may attempt to generate a reconstruction of the data item, but the reconstruction will likely have sufficient differences from the data item given that the model combination is biased toward generating reconstructions that are similar to the data items corresponding to the concept(s) of the known training set. Such differences may be used by system 100 (e.g., the prediction models or other components of system 100) to detect that an anomaly exists in the data item.

In some embodiments, with respect to the foregoing first and second prediction models, system 100 may use the first and second prediction models to detect that an anomaly (e.g., outside the known concepts) exists with respect to one or more data items. In some embodiments, system 100 may obtain a collection of data items that correspond to a concept and provide the data items to a first prediction model. Based on the provided data items, the first prediction model may generate hidden representations of the data items, and system 100 may provide the hidden representations to the second prediction model. Based on the provided hidden representations, the second prediction model may generate reconstructions of the data items from the hidden representations of the data items. System 100 may provide the reconstructions of the data items as reference feedback to the first prediction model to cause the first prediction model to assess the reconstructions of the data items (e.g., by assessing the reconstructions against the data items). Based on the assessment, the first prediction model may update one or more configurations (e.g., representation-generation-related configurations) of the first prediction model. As an example, the first prediction model may adjust the weights or other parameters of the first prediction model based on the assessment of the reconstructions. The update/adjustment may, for instance, configure the first prediction model to improve its generation of hidden representations in a way that causes the second prediction model to generate reconstructions that are more similar to the data items corresponding to the hidden representations. As an example, the first prediction model may learn (or continue to learn) one or more generative algorithms to improve its generation of hidden representations (e.g., by updating/adjusting the generative algorithms or parameters for such algorithms).

In some embodiments, the first prediction model may encode a data item as a vector representing the data item (e.g., a latent vector representing the data item in a latent space) and produce the vector as a hidden representation of the data item. As an example, the first machine learning model may learn one or more generative algorithms to generate a hidden representation of a data item (e.g., a latent vector representing the data item in a latent space). The generative algorithms may be learned by the first machine learning model based on training on a collection of data items, feedback from another machine learning model (e.g., as described herein) or other source (e.g., user-provided feedback), or other data. In some embodiments, the second machine learning model may "decode" a hidden representation of a data item to reconstruct a version of the data item. As an example, the second machine learning model may learn one or more generative algorithms to generate a reconstruction of a data item. The generative algorithms may be learned by the second machine learning model based on training on the hidden, feedback from another machine learning model (e.g., via generative adversarial network techniques) or other source (e.g., user-provided feedback), or other data.

In some embodiments, the second prediction model may be trained (e.g., separately from the first prediction model) as a generative model as part of a generative adversarial network in which the generative model and a discriminative model "compete" with one another in a zero-sum game framework. In one use case, the generative model generates candidates from latent vectors, and the discriminative model evaluates the candidates, where the generative model learns to map from a latent space to a particular data distribution of interest (e.g., corresponding to a given concept or concepts), and where the discriminative network discriminates between instances from the data distribution and candidates produced by the generative model. The generative model may be configured with the training goal of increasing the error rate of the discriminative model (e.g., "trick" the discriminative model into guessing that the generated candidates are instances from the data distribution), while the discriminative model may be configured with the training goal of decreasing its error rate.

In a further use case, a known data set may be provided as the initial training data for the discriminative model, and the discriminative model may be provided samples from the training data set until the discriminative model reaches a threshold accuracy level. The generative model may be seeded with a randomized input sampled from a predefined latent space, and samples produced by the generative model are then evaluated by the discriminative model. Backpropagation may be applied in both models so that (i) the generative model produces data items that more closely resemble the training data set (e.g., images or other data items of the training data set) and (ii) the discriminative model becomes better at identifying "fake" reproductions from the actual data items in the training data. In some use cases, the generative model may be a deconvolutional neural network, and the discriminative model may be a convolutional neural network.

In some embodiments, model subsystem 116 may obtain a collection of data items and provide the data items to a first prediction model (e.g., a prediction model of a multi-model architecture, a prediction model from model database(s) 136, etc.). In response, with respect to each data item, the first prediction model may generate a hidden representation based on the data item. As an example, the data items may include documents, audios, images, videos, sensor data recordings, or other data items that correspond to one or more given concepts (e.g., healthy brain, brain with tumors, healthy heart, diseased heart with certain condition, cat, dog, or other concept). Such data items may include training data from one or more databases, real-time streaming data (e.g., from one or more sensors), or other data. The hidden representations may include compressed representations of the data items, other representations having reduced resource sizes than their corresponding data items, or other hidden representations. In some embodiments, the first prediction model may encode the input data (e.g., the data items) as vectors representing the data items (e.g., latent vectors representing the data items in a latent space) based on one or more generative algorithms learned by the first prediction model (e.g., via training on the data items, feedback from another prediction model or other source, or other data). In some embodiments, with respect to each hidden representation, feedback subsystem 118 may provide a reconstruction of the data item (e.g., that is generated from the hidden representation) as feedback to the first prediction model. Based on the reconstruction, the first prediction model may update one or more of its configurations and generate an additional hidden representation of the data item. For each additional hidden representation of the data item, the foregoing operations may be repeated until a reconstruction derived from the additional hidden representation is sufficiently similar to the original data item (e.g., based on the similarities between the data item and the reconstruction satisfying one or more similarity thresholds). As an example, the first prediction model may learn (or continue to learn) one or more generative algorithms to improve its generation of hidden representations (e.g., by updating/adjusting the generative algorithms or parameters for such algorithms) such that, when another given prediction model is provided a hidden representation of the data item, the other prediction model generates a reconstruction of the data item that is sufficiently similar to the data item (e.g., a reconstruction of an image that closely resembles the original input image, a reconstruction of an audio file that sounds similar to the original input audio file, etc.).

In some embodiments, model subsystem 116 may obtain hidden representations of data items (e.g., hidden representations generated by a first prediction model) and provide the hidden representations to a second prediction model. In response, the second prediction model may generate reconstructions of the data items from the hidden representations. In some embodiments, the second prediction model may convert the hidden representations into reconstructions of the data items. In one use case, where a hidden representation of a data item is generated by the first prediction model, the hidden representation may be provided to the second prediction model, and the second prediction model may generate a reconstruction of the data item based on the hidden representation (e.g., using one or more generative algorithms learned by the second prediction model to generate the reconstruction from the hidden representation). In some embodiments, based on the reconstruction of the data item, detection subsystem 120 may determine information regarding the data item, such as (i) a classification of the data item (e.g., identification of a given concept in the data item), (ii) the existence of an anomaly in the data item (e.g., identification that no classification is known with respect to the data item), (iii) which portions of the data item correspond to an anomaly (or an unknown classification/concept) or the locations of the anomaly, or (iv) other information.

Figure 2:
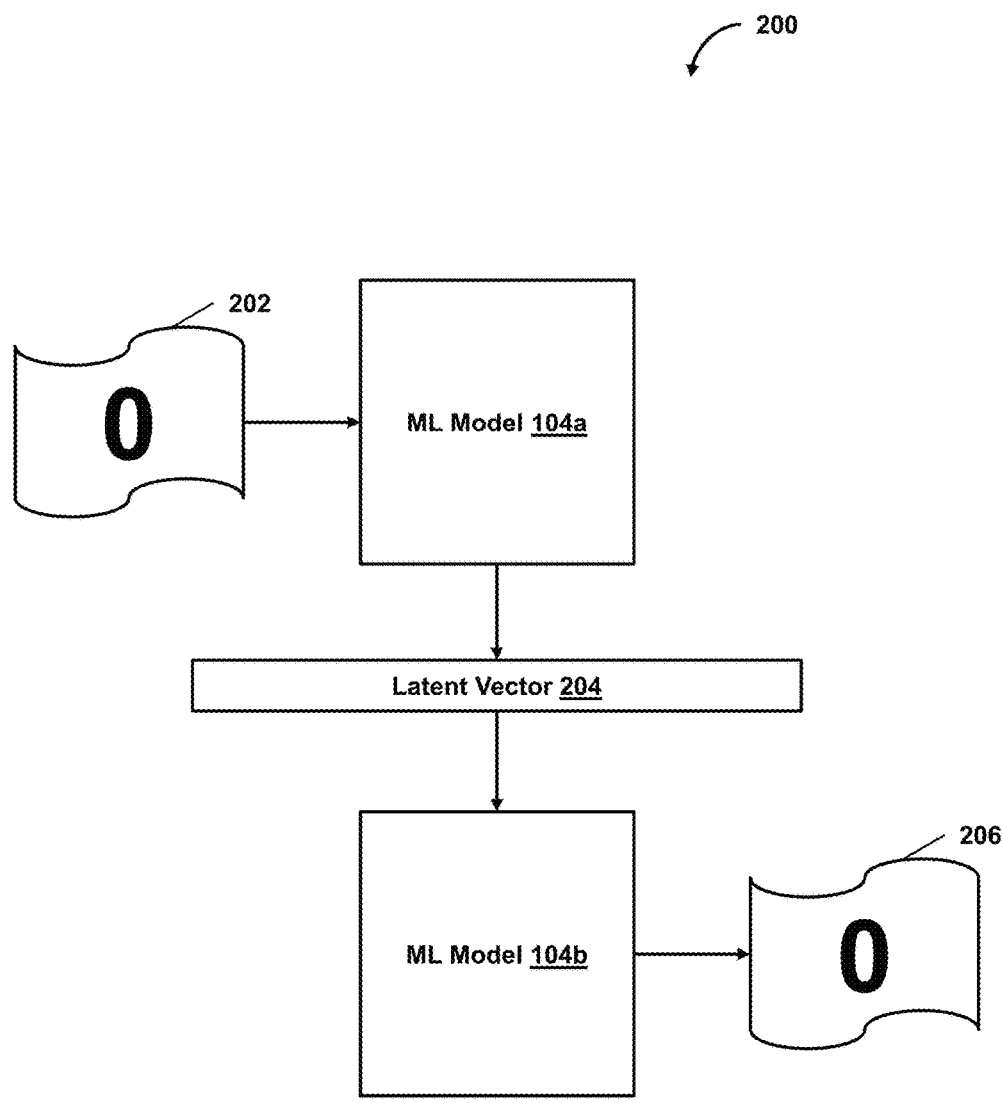
FIG. 2 show an architecture that includes two machine learning models for anomaly or concept detection, in accordance with one or more embodiments.

In one use case, with respect to FIG. 2, architecture 200 may include ML models 104a and 104b trained on images of 0s and 1s (e.g., computer-generated images of 0s and 1s, images of handwritten 0s and 1s, etc.). As indicated in FIG. 2, architecture 200 is configured such that input 202 (e.g., an image of "0") is provided to ML model 104a, an output of ML model 104a in the form of latent vector 204 (e.g., a latent vector representing the image of "0" in a latent vector space) is provided to ML model 104b, and output 206 (e.g., a reconstruction of "0") is provided by ML model 104b. Based on the training to recognize 0s or 1s in an image (or to classify an image as either a 0 or 1), architecture 200 will produce reconstructions of input images of 0s and 1s that closely resemble such input images. In a further use case, a simple standard data set from the MNIST database (e.g., a large database of handwritten digits commonly used for training various image processing systems) may be used to train architecture 200. As an example, architecture 200 may initially be trained to consider as normal about 12,000 handwritten 0s and 1s (or other number of 0s and 1s). Any random latent vector provided as input to ML model 104b would generate a 0 or 1 as output from ML model 104b. Simultaneously (or during other times), ML model 104a maps any input into the latent vector space during the training phase with the goal of matching the input and output data as closely as possible.

Figure 3A:
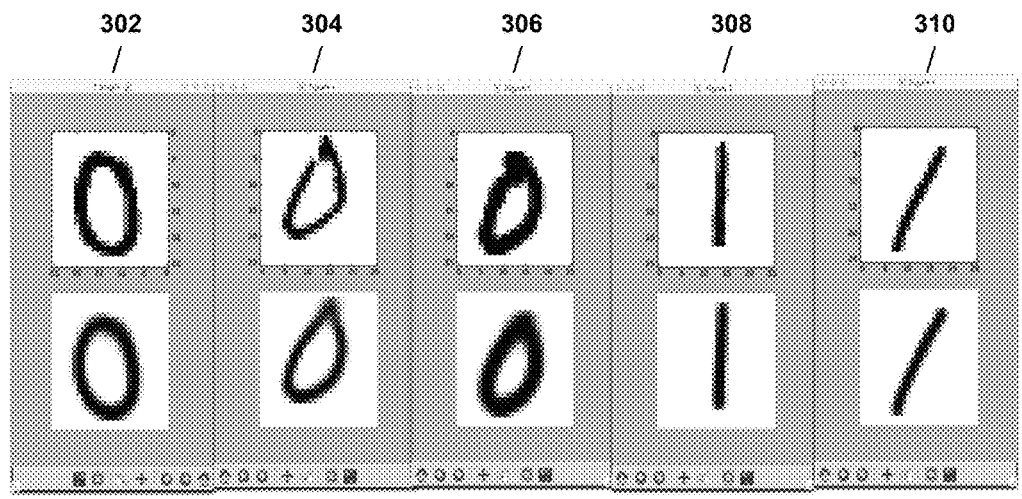
FIGS. 3A-3B show inputs and outputs of an architecture with respect to FIG. 2, in accordance with one or more embodiments.
Figure 3B:
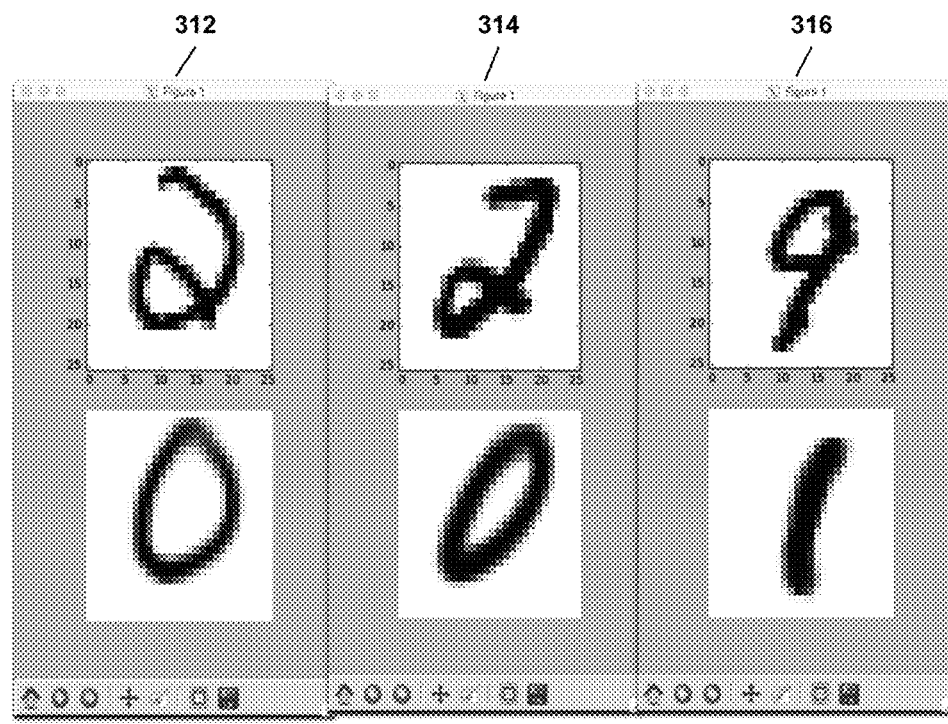

As such, with respect to FIG. 3A, the input images (e.g., 0, 0, 0, 1, 1, respectively) on the top of screenshots 302, 304, 306, 308, and 310 (that are provided to the trained architecture 200) closely resemble the reconstructed images on the bottom of the respective screenshots. When, however, images of different numbers are provided as input to architecture 200, it will produce reconstructions that are greatly bias toward images of the known training set. As such, although there may be some similar characteristics (e.g., orientation, position, shading, thickness, etc.) between the input images of numbers other than 0s and 1s and the reconstructions that architecture 200 produces, the differences in this case may be distinctively recognizable. With respect to FIG. 3B, for example, the input images (e.g., 2, 2, 9, respectively) on the top of screenshots 312, 314, and 316 are drastically different from the reconstructed images (e.g., resembling 0, 0, 1, respectively). That is, when presented with an anomaly such as a digit 2 (e.g., previously not seen by architecture 200), the network continues to generate 0s and 1s, thus leading to a large discrepancy between the input images and the reconstructions. Such different characteristics between the input images and the reconstructions (or, in this case, the large discrepancies) may be used to determine that an anomaly exists in each of the input images with respect to the "normal" of the known training set (e.g., where 0s and 1s are "normal," and any number or character other than 0s or is 1s an anomaly).

In some embodiments, with respect to FIG. 1A, ML model 104b may remain a "control" as part of architecture 102, while ML model 104a is continually learning during the training process. As indicated, the output of ML model 104b (e.g., reconstructions of data items) may be provided as feedback to ML model 104a, which may be used by ML model 104a to update one or more configurations (e.g., weights, other parameters, or other configurations) of ML model 104. In some embodiments, although the output of ML model 104a may be provided as input to ML model 104b (e.g., a hidden representation to be converted into a reconstruction), no output of ML model 104a may be provided as feedback to ML model 104b. As an example, ML model 104b may be trained separately/independently from ML model 104a. As indicated herein, in some embodiments, ML model 104b may be trained as a generative model as part of generative adversarial network (e.g., in which the generative model and a discriminative model "compete" with one another in a zero-sum game framework). In some embodiments, although ML model 104b may be a generative model, an adversarial network need not be implemented to train ML model 104b, and other techniques may be used to train ML model 104b.

In some embodiments, a multi-model architecture may include first, second, and third prediction models (or other prediction models). As an example, the first prediction model may have the configurations of ML model 104a of FIG. 1A (or ML model A of other figures described herein), and the second prediction model may have the configurations of ML model 104b of FIG. 1A (or ML model B of other figures described herein). The third prediction model may be configured to indicate (i) similarities or differences between two or more data items (e.g., the input data item and its corresponding reconstruction), (ii) whether two data items are similar or different (e.g., whether certain characteristics of the two data items are within one or more threshold ranges, such as thresholds learned via training or predefined manually), (iii) whether an anomaly exists in a data item (e.g., based on the third prediction model's assessment of the data item and its reconstruction(s) with one another), (iv) whether a data item has a classification (or concept) corresponding to the "normal" of the training set, or (v) other information. As an example, with respect to FIG. 4, architecture 400 may include ML models A, B, and C, where data 106 (e.g., an input data item) is provided to the ML model A and the ML model C, output 110 of the ML model A (e.g., a hidden representation of the data item) is provided to the ML model B, and output 108 of the ML model B (e.g., a reconstruction of the data item) is provided by the ML model B to ML model C. Based on the data item and the reconstruction, the ML model C may generate output 402 in the form of one or more of the foregoing indications derived from the similarities or differences between the data item and the reconstruction.

In some embodiments, the third prediction model may be trained to minimize network bias to optimize detection of anomalies (e.g., including small abnormalities). In some embodiments, a collection of data items corresponding to the same concept(s) (e.g., on which the first and second prediction models are trained) may be obtained and provided to the combination of the first and second prediction models to cause the combination to generate reconstructions of the corresponding input data items. Model subsystem 116 may provide each of the data items and its corresponding reconstruction to the third prediction model to train the third prediction model to recognize each of the corresponding pairs of data item and its reconstruction as similar (e.g., indicating no anomaly with respect to the trained "normal"). As an example, with respect to each of the corresponding pairs, model subsystem 116 may provide feedback to the third prediction model that the third prediction model uses as a reference to assess its predictions of whether or how the data input and its reconstruction is similar or different. Based on its assessment, the third prediction model may update one or more of its configurations (e.g., one or more layers of the ML model C, one or more weights or other parameters of the ML model C, etc.). The feedback may, for example, indicate that each data item of the collection and its reconstruction are similar or that no anomaly exists (e.g., no anomaly should be detected as a result of a comparison of the data item and its reconstruction). As such, with respect to the training set, the third prediction model learns that differences between a data item and its reconstruction that result (e.g., on a frequent basis) from the processing of the data item (by the combination of the first and second prediction models to generate the reconstruction) are to be ignored or given less weight when processing other data items and their reconstructions (e.g., data items that are not part of the training set). As compared to conventional statistical techniques (e.g., which requires a programmer to manually adjust the similarity thresholds), the third prediction model is configured to automatically adjust how much weight (if any) is to be given to certain similarities and differences (e.g., low or no weight to common differences that are demonstrated by data items of the training set and their reconstructions). In this way, for example, the third prediction model produces more accurate results (e.g., by accounting for the network bias via the foregoing training).

In some embodiments, data items from the data item collection (e.g., corresponding to the same concept(s) on which the first and second prediction models are trained) or reconstructions of the data items may be provided as a comparison set (e.g., as a pair, a triple, etc.) to the third prediction model, where the third prediction model may assess the data items or reconstructions of the comparison set with one another. Based on its assessment, the third prediction model may update one or more of its configurations. In some embodiments, model subsystem 116 may provide two data items of the data item collection as a comparison set to the third prediction model to train the third prediction model to recognize the data items as different (or not similar). In some embodiments, model subsystem 116 may provide a data item of the data item collection and a reconstruction of another data item (of the data item collection) as a comparison set to the third prediction model to train the third prediction model to recognize the data item and the other data item's reconstruction as not similar. As an example, with respect to the two data items or the pair (that includes the data item and the other data item's reconstruction), model subsystem 116 may provide feedback to the third prediction model that the third prediction model uses as a reference to assess its predictions of whether or how the two data inputs is similar or different. The feedback may, for example, indicate that the two data inputs are different (or not similar). As such, with respect to (i) different data items corresponding to the same concept or (ii) a data item and another data item's reconstruction corresponding to the same concept, the third prediction model learns the small differences between each corresponding data input pair.

Figure 4:
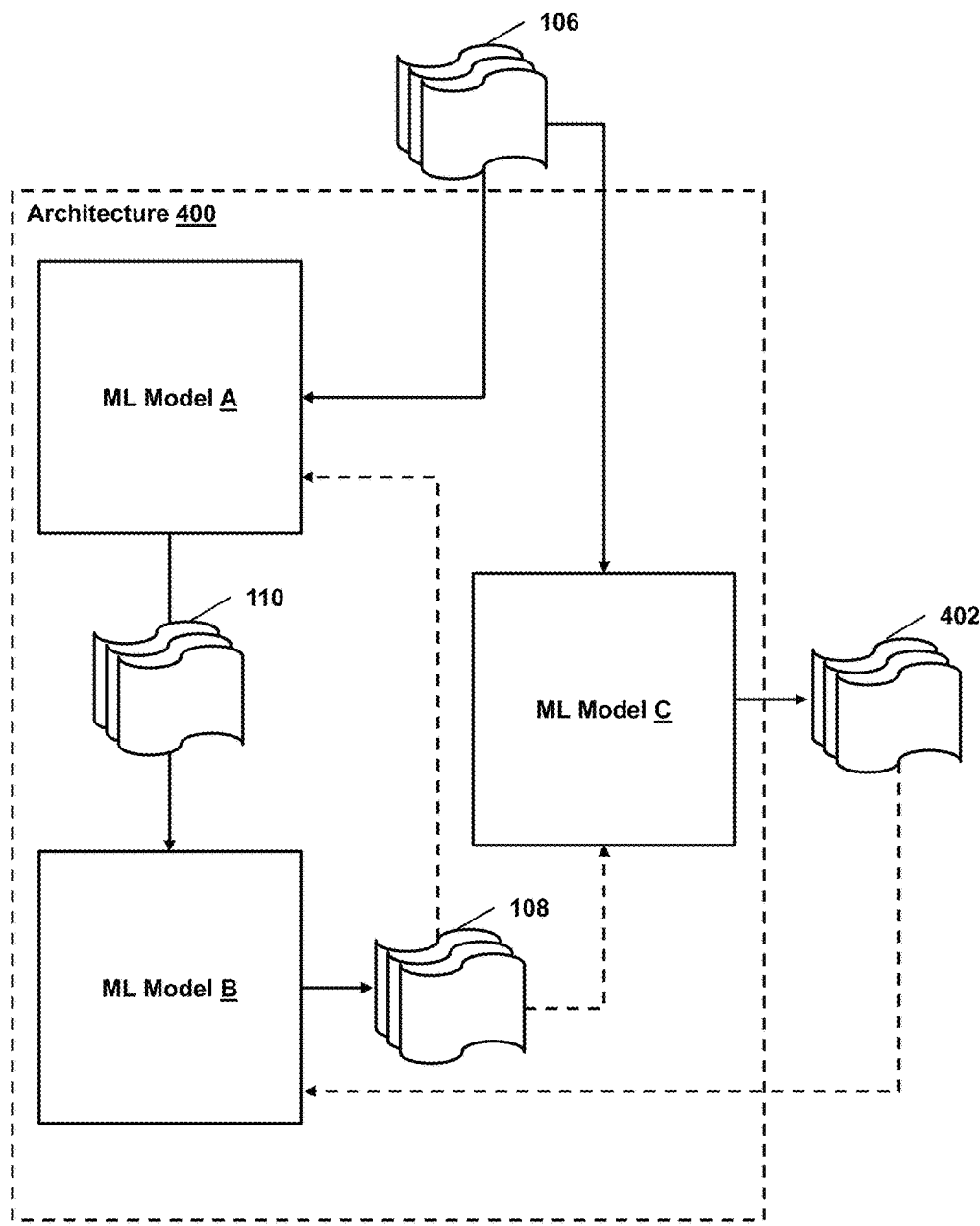
FIG. 4 show an architecture that includes three machine learning models for anomaly or concept detection, in accordance with one or more embodiments.

In one use case, with respect to FIG. 4, a first data item (e.g., from a training set corresponding to "normal" for architecture 400) and its reconstruction (e.g., generated by the ML model B of architecture 400) are provided to the ML model C of architecture 400 along with feedback indicating that the two inputs are similar. In response, the ML model C may assess its predictions against the feedback and learn over time to ignore or give less weight to differences between the first data item and its reconstruction when such differences show up again between two other data inputs (e.g., by deemphasizing such differences during the ML model C's update of its configurations). In addition, the first data item and a second data item (e.g., from the same training set) may be provided to the ML model C along with feedback indicating that the two inputs are different or not similar. In response, the ML model C may assess its predictions against the feedback and learn over time to give greater weight to certain differences between the first and second data items when such differences show up again between two other data inputs (e.g., by emphasizing such differences during the ML model C's update of its configurations to the extent that such differences do not include the common differences between two similar data inputs). In this way, for example, network biases that result from the ML model's processing of a data item (e.g., the generation of a hidden representation of the data item in combination with the generation of the reconstruction from the hidden representation) may be trained out of the ML model C, but the ML model C may still be trained to recognize anomalies without necessarily requiring the use of anomalous data (e.g., data items that do not correspond to the same concept as the training set on which ML models A and B of architecture 400 are trained).

Figure 5A:
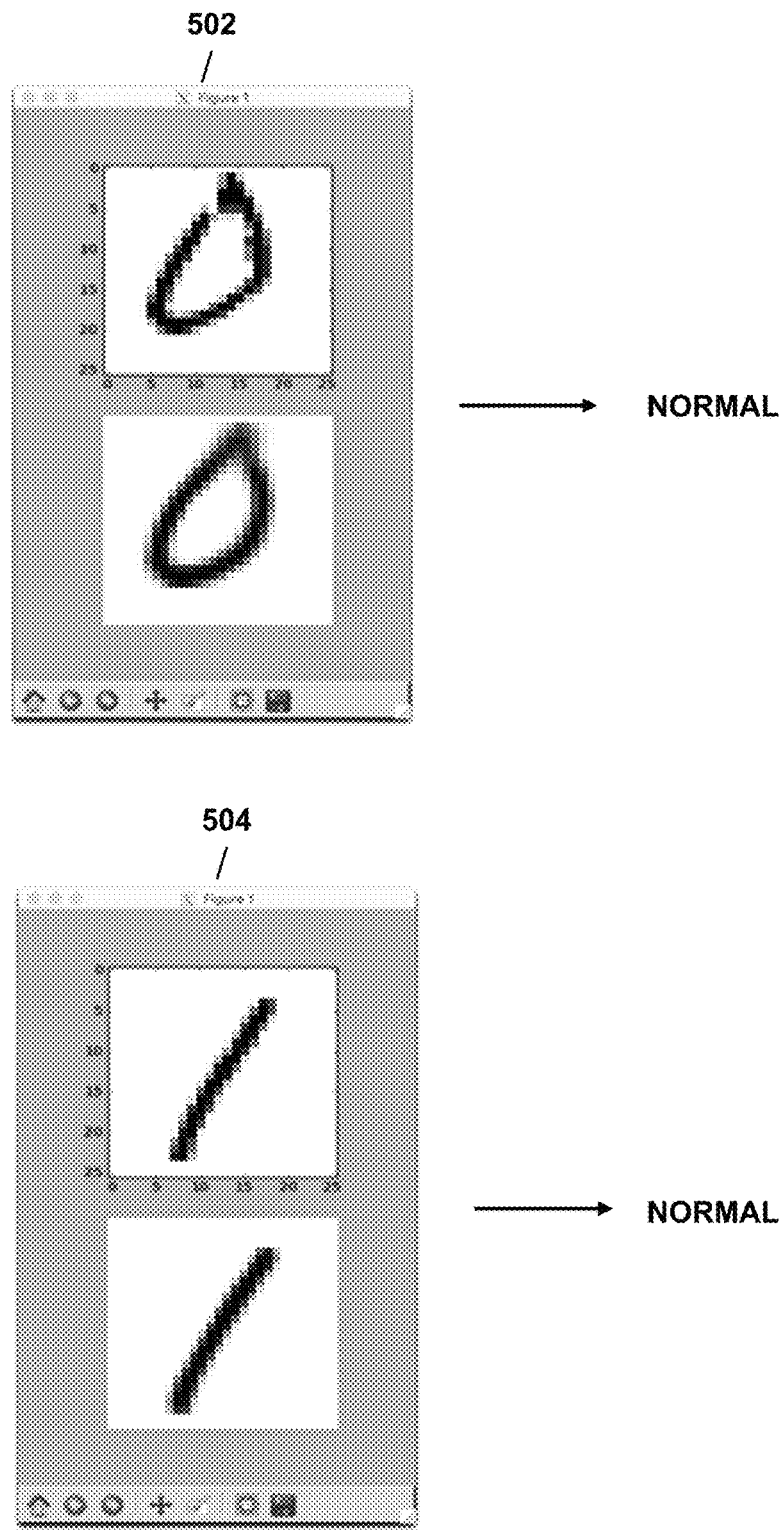
FIGS. 5A-5B show inputs and outputs of an architecture with respect to FIG. 4, in accordance with one or more embodiments.

As discussed, in some embodiments, when an data item is provided and does not correspond to the concept(s) on which the combination of the first and second prediction models was trained, the combination of the first and second prediction models may attempt to generate a reconstruction of the data item, but the reconstruction will likely have sufficient differences from the data item given that the model combination is biased toward generating reconstructions that are similar to the data items corresponding to the concept(s) of the known training set. As an example, with respect to FIG. 5A, when the input image of "0" (e.g., top image of screenshot 502) is provided to ML model A of architecture 400 (of FIG. 4), ML model B of architecture 400 generates a very similar reconstruction (e.g., bottom image of screenshot 502) because ML models A and B were trained on a data set of images of 0s and 1s. Based on its training, ML model C of architecture 400 outputs an indication that no anomaly exists. Likewise, when the input image of "1" (e.g., top image of screenshot 504) is provided to ML model A, ML model B generates a very similar reconstruction (e.g., bottom image of screenshot 504), and ML model C outputs an indication that no anomaly exists.

Figure 5B:
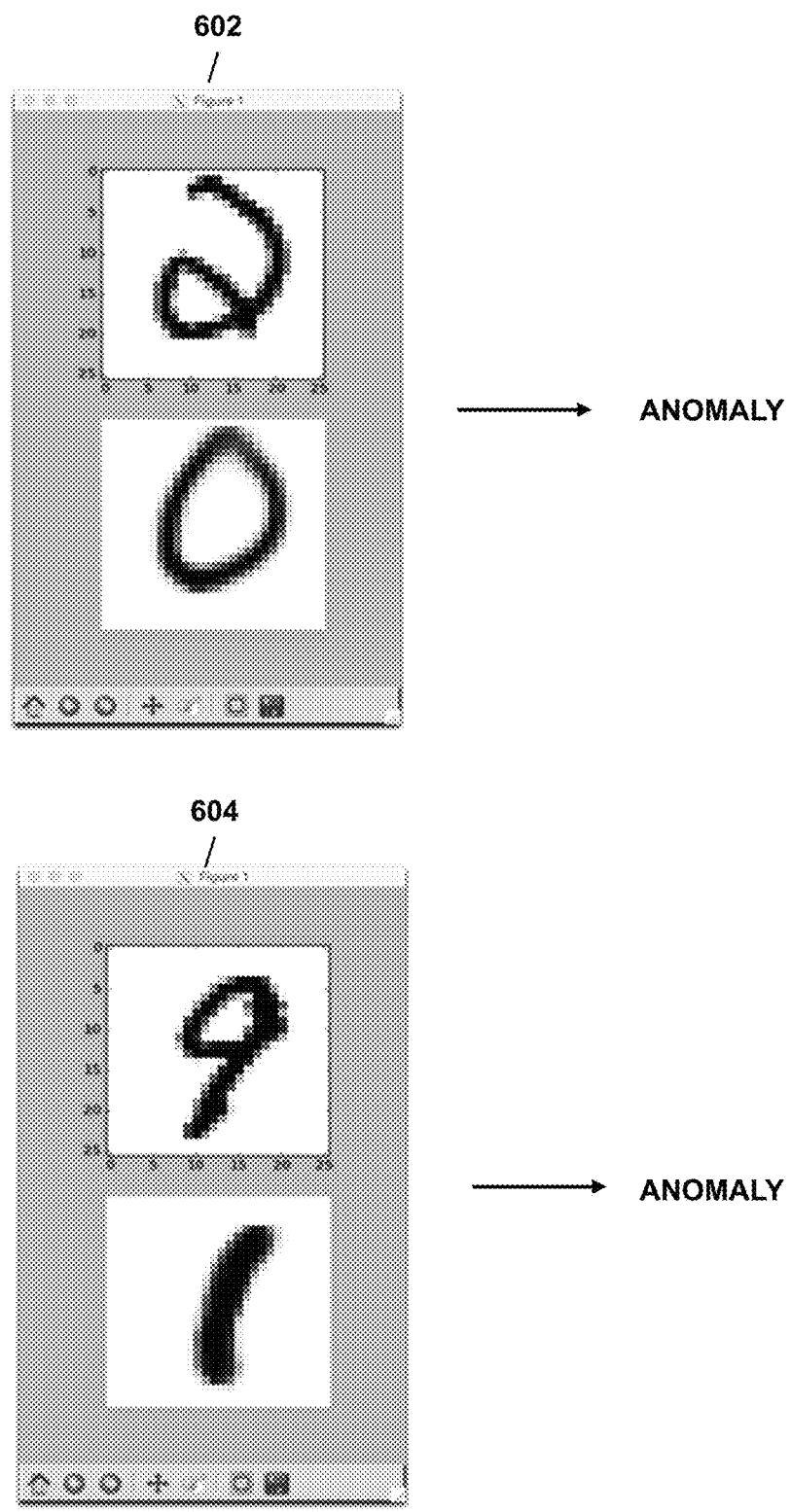

On the other hand, with respect to FIG. 5B, when an input image of "2" (e.g., top image of screenshot 602) is provided to ML model A of architecture 400 (e.g., of FIG. 4), ML model B of architecture 400 generates a reconstruction that resembles a "0" as opposed to a "2" because ML models A and B were trained only on a data set of images of 0s and 1s (e.g., the reconstructed "0" was ML model B's attempt at redrawing the input image from its hidden representation).

Based on its training, ML model C of architecture 400 outputs an indication that an anomaly exists in the input image of "2." Likewise, when an input image of "9" (e.g., top image of screenshot 604) is provided to ML model A, ML model B generates a reconstruction that resembles a "1" as opposed to a "9" because ML models A and B were trained only on a data set of images of 0s and 1s (e.g., the reconstructed "1" was ML model B's attempt at redrawing the input image from its hidden representation). As such, ML model C of architecture 400 outputs an indication that an anomaly exists in the input image of "9."

In some embodiments, a multi-model architecture includes first, second, and third prediction models, the first and second prediction models have the configurations of ML models 104*a* and 104*b* of FIG. 1A, respectively, and the third prediction model has the configurations of ML model C of figures described herein. In one use case, the third prediction model may be trained on data items corresponding to the same concept(s) (e.g., on which the first and second prediction models are trained). Additionally, or alternatively, the third prediction model may be trained on other data items that do not correspond to such concepts. As an example, model subsystem 116 may provide such other data items (that do not correspond to the training-associated concepts) and their respective corresponding reconstructions to the third prediction model to recognize each of the corresponding pairs of data item and its reconstruction as different (or not similar) (e.g., indicating that an anomaly with respect to the trained "normal"). As an example, with respect to each of the corresponding pairs, model subsystem 116 may provide feedback to the third prediction model that the third prediction model uses as a reference to assess its predictions of whether or how the data input and its reconstruction is similar or different, where the feedback indicates that each data item of the collection and its reconstruction are different (or not similar) or that an anomaly exists (e.g., an anomaly should be detected as a result of a comparison of the data item and its reconstruction). In one scenario, with respect to FIG. 4, a first data item (e.g., from a training set corresponding to "normal" for architecture 400) and its reconstruction (e.g., generated by the ML model B of architecture 400) are provided to the ML model C of architecture 400 along with feedback indicating that the two inputs are similar. In response, the ML model C may assess its predictions against the feedback and learn over time to ignore or give less weight to differences between the first data item and its reconstruction when such differences show up again between two other data inputs (e.g., by deemphasizing such differences during the ML model C's update of its configurations). In addition, a second data item (that does not correspond to the same concept as the training set on which the ML model A and B are trained) and its reconstruction may be provided to the ML model C along with feedback indicating that the two inputs are different or not similar. In response, the ML model C may assess its predictions against the feedback and learn over time to give greater weight to certain differences between the second data item and its reconstruction when such differences show up again between two other data inputs.

In some embodiments, detection subsystem 120 may determine one or more portions of a data item that corresponds to an anomaly (or an unknown classification/concept) and cause presentation of the anomaly-corresponding portions via a user interface. In some embodiments, with respect to a data item and its reconstruction generated by a multi-model architecture, detection subsystem 120 may determine that one or more differences between the data item and the reconstruction are differences common among data item/reconstruction pairs that correspond to the same concept(s) on which the multi-model architecture was trained. As an example, based on such determination, detection subsystem 120 may deemphasize such differences. As another example, the more frequent that a common difference occurs among data item/reconstruction pairs corresponding to the training-associated concepts, the greater the de-emphasis may be applied by detection subsystem 120 to the difference (e.g., giving less weight to the difference the more frequent such difference occurs among data item/reconstruction pairs corresponding to the training-associated concepts).

Additionally, and alternatively, detection subsystem 120 may determine that one or more differences between the data item and the reconstruction are differences uncommon among data item/reconstruction pairs that correspond to the same concept(s) on which the multi-model architecture was trained. As an example, based on such determination, detection subsystem 120 may emphasize such differences. As another example, the less frequent that an uncommon difference occurs among data item/reconstruction pairs corresponding to the training-associated concepts, the greater the emphasis may be applied by detection subsystem 120 to the difference (e.g., giving more weight to the difference the less frequent such difference occurs among data item/reconstruction pairs corresponding to the training-associated concepts). In some embodiments, detection subsystem 120 may detect an anomaly in the data item based on (i) the deemphasized differences, (ii) the emphasized differences, (iii) the amount of the de-emphasis or emphasis applied to the differences, or (iv) other information. In some embodiments, detection subsystem 120 may modify a presentation of the data item based on (i) the deemphasized differences, (ii) the emphasized differences, (iii) the amount of the de-emphasis or emphasis applied to the differences, or (iv) other information. As an example, detection subsystem 120 may cause one or more portions of the data item to be deemphasized (e.g., deemphasizing such portions by an amount corresponding to the amount of the de-emphasis, such as increasing or decreasing the brightness, sharpness, contrast, or other attributes of such portions). As another example, detection subsystem 120 may cause one or more portions of the data item to be emphasized (e.g., emphasizing such portions by an amount corresponding to the amount of the emphasis).

In some embodiments, where a multi-model architecture includes first, second, and third prediction models (and the first, second, and third prediction models have the configurations of ML models A, B, and C of figures described herein, respectively), the third prediction model may output an indication of one or more portions of a data item that corresponds to an anomaly (or an unknown classification/concept). In some embodiments, with respect to a data item and its reconstruction generated by the multi-model architecture, the third prediction model may learn to ignore or give less weight to differences common among data item/reconstruction pairs (that correspond to the same concept(s) on which the multi-model architecture was trained) (e.g., based on the training described herein with respect to the third prediction model). In one use case, the third prediction model may automatically decrease the weight that it attributes to a common difference the more frequent that the common difference occurs among data item/reconstruction pairs corresponding to the training-associated concepts. Additionally, and alternatively, the third prediction model may learn to give greater weight to differences uncommon among data item/reconstruction pairs (that correspond to the same concept(s) on which the multi-model architecture was trained) (e.g., based on the training described herein with respect to the third prediction model). In one scenario, the third prediction model may automatically increase the weight that it attributes to a difference the less frequent that the difference occurs among data item/reconstruction pairs corresponding to the training-associated concepts.

In some embodiments, the third prediction model may emphasize or deemphasize one or more portions of a data item. In some embodiments, the third prediction model may emphasize or deemphasize such portions of the data item based on weights associated with differences corresponding to such portions (e.g., weights that the third prediction model automatically attributes to differences between the two data items, such as the data item and its reconstruction, differences between different data items from the same training set on which the first and second predictions are trained, etc.)). As an example, the third prediction model may emphasize one or more portions of the data item based on the weights associated with such portions (or the differences corresponding to such portions) satisfying one or more weight thresholds (e.g., exceeding an emphasis threshold). As a further example, the third prediction model may apply greater emphasis for greater weights and less emphasis for lower weights (e.g., that still satisfy the weight thresholds). As another example, the third prediction model may deemphasize one or more portions of the data item based on the weights associated with such portions (or the differences corresponding to such portions) satisfying one or more weight thresholds (e.g., less than a de-emphasis threshold). As a further example, the third prediction model may apply greater de-emphasis for lower weights and less de-emphasis for greater weights. In some embodiments, the third prediction model may output an indication of the emphasized/deemphasized portions (e.g., in the form of a document, image, video, or other data item), where the emphasized portions correspond to an anomaly (or an unknown classification/concept), thereby indicating the existence of an anomaly.

Figure 6A:
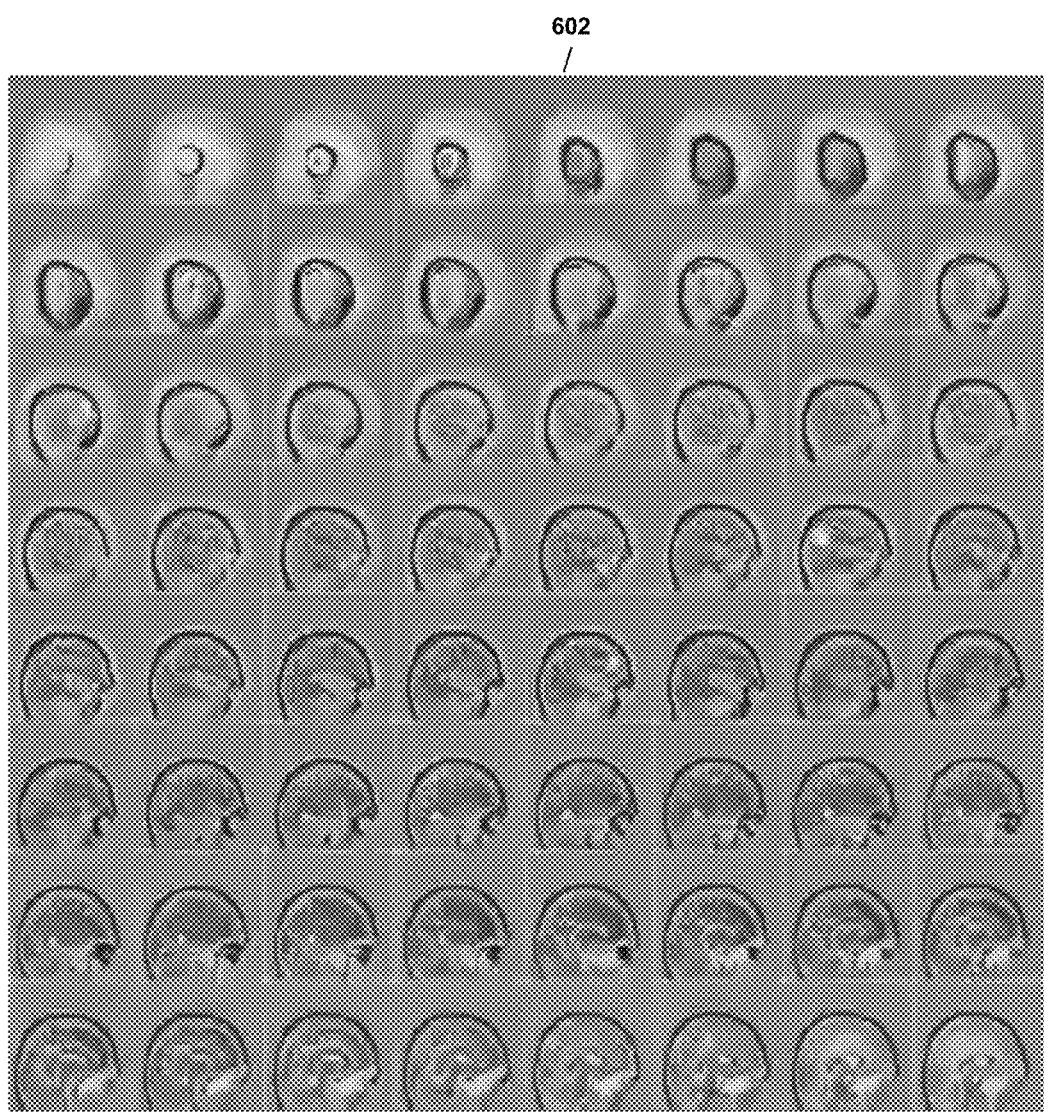
FIGS. 6A-6C show the progress of multi-model architecture over time with respect to identifying anomalies, in accordance with one or more embodiments.
Figure 6B:
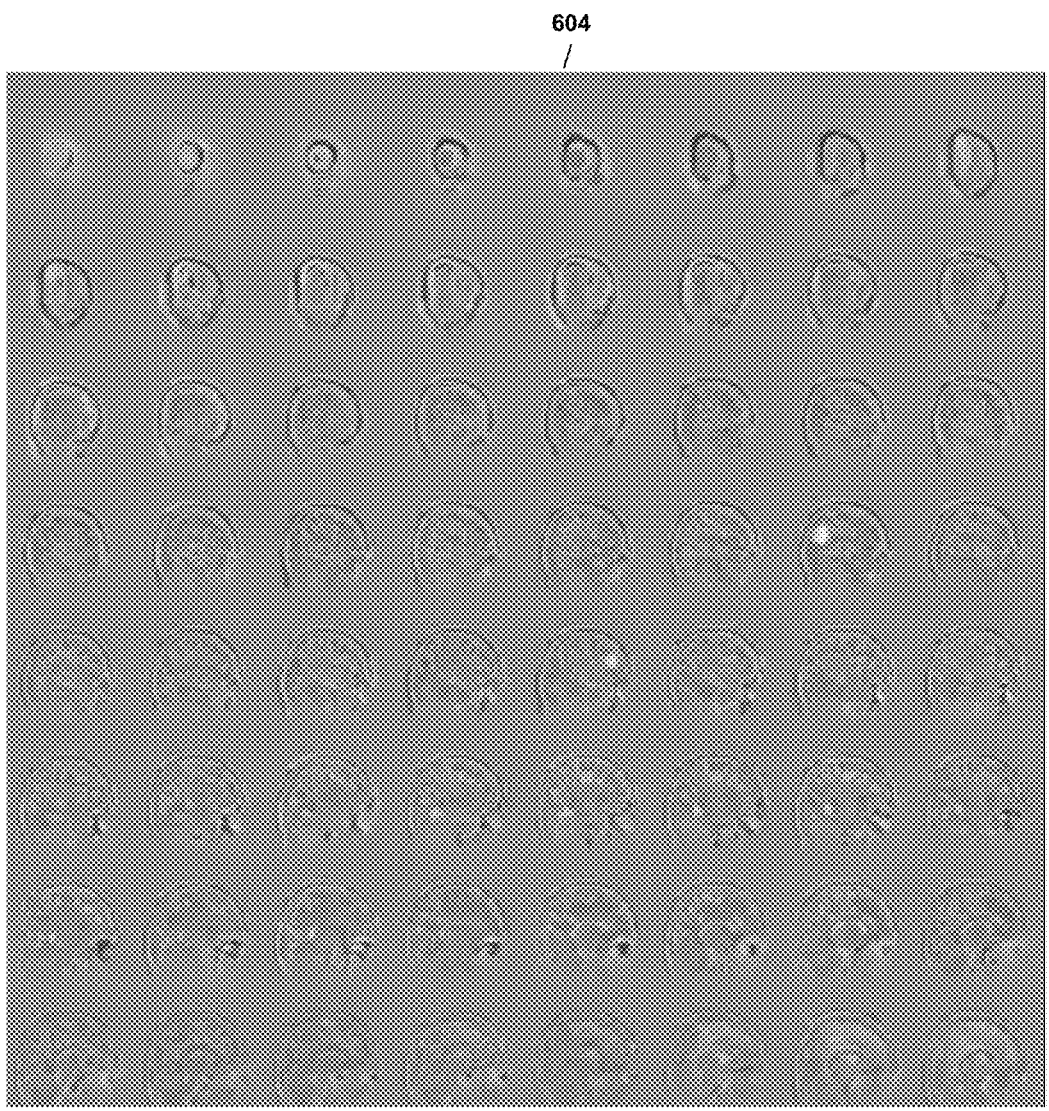
Figure 6C:
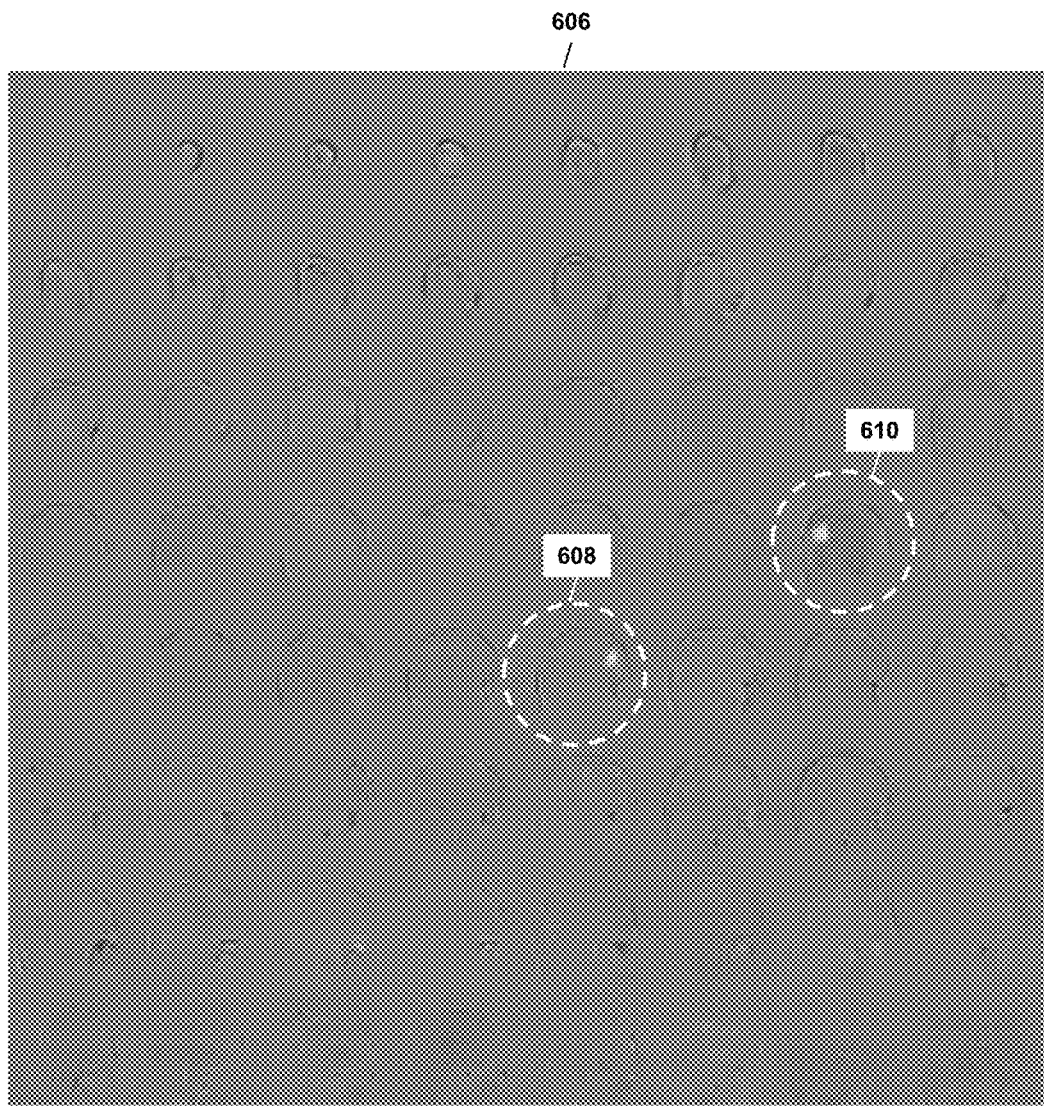

In one use case, with respect to FIGS. 6A-6C, ML model C of architecture 400 (e.g., of FIG. 4) may output an indication of one or more emphasized/deemphasized portions of 64 brain scan images. FIGS. 6A-6C show screenshots of the outputs of the ML model C that correspond to input brain scan images of a test set. Screenshots 602 of FIG. 6A show the outputs of the ML model C when the ML models of architecture 400 have had little or no training with respect to a collection of data items (e.g., corresponding to a given concept). Screenshots 604 of FIG. 6B show the outputs of the ML model C when the ML models of architecture 400 have had some training (greater the amount of training, as compared to screenshots 602) with respect to the data item collection. Screenshots 606 of FIG. 6C show the outputs of the ML model C when the ML models of architecture 400 have had the greatest amount of training (relative to the instances of the ML model C corresponding to FIGS. 6A and 6B). As indicated by the image outputs 608 and 610 of FIG. 6C, each of the input brain scan images corresponding to the image outputs 608 and 610 have characteristics of anomalies in one portion of that brain scan image (e.g., the brightened/white portion corresponding to the back of the brain as shown in image output 608, and the brightened/white portion corresponding to the front of the brain as shown in image output 610). As indicated by the other image outputs of FIG. 6C, ML model C has predicted that the other brain scan images show no signs of an anomaly (e.g., with respect to the "normal" of the training set corresponding to a given concept or concepts).

As another example, with respect to FIG. 6A, when the ML models of architecture 400 has not been trained or has had little training on data items of the training set (e.g., corresponding to a given concept or concepts), the ML models have not been sufficiently trained on what is "normal." As such, it would be difficult to observe (from the screenshots 602 of FIG. 6A) which of the brain scan images have classifications (e.g., brain with stroke) that are anomalies with respect to the "normal" of the training set. Although the ML model C may have emphasized or deemphasized certain portions of the brain scan images, such emphasis or de-emphasis are not as clear as compared to the emphasis and de-emphasis shown in screenshots 606 of FIG. 6C. As a further example, with respect to FIG. 6B, as the ML models of architecture 400 continues to be trained on the data items of the training set, it becomes more clear which of the brain scan images have classifications that are anomalies with respect to the "normal" of the training set. As compared to screenshots 602 of FIG. 6A, it is clear that the ML model C has applied more emphasis or more de-emphasis on most portions of the brain scan images. As the ML models of architecture 400 continue to be trained on the training set, the outputs of the ML model C (that corresponds to the test set of brain scan images) eventually become what is shown by screenshots 606 of FIG. 6C, where it is clear from the outputs which of the brain scan images of the test set are predicted to have anomalies or are predicted to have no anomalies with respect to the "normal" of the training set.

In some embodiments, a first prediction model (e.g., ML model A of FIG. 4) may be configured to generate a hidden representation of a data item, and a second prediction model (e.g., ML model B of FIG. 4) may be configured to generate a reconstruction of a data item based on a hidden representation of the data item, where a discriminative model may be used to train the second prediction model. In some embodiments, a third prediction model (e.g., ML model C of FIG. 4) may act as the discriminative model to train the second prediction model, wherein the third prediction model may be configured to indicate (i) similarities or differences between two or more data items (e.g., the input data item and its corresponding reconstruction), (ii) whether two data items are similar or different, (iii) whether an anomaly exists in a data item, (iv) whether a data item has a classification (or concept) corresponding to the "normal" of the training set, or (v) other information. Thus, in some embodiments, the first, second, and third prediction models may be trained simultaneously "end-to-end." As an example, with respect to FIG. 4, the ML model A may be trained to generate better hidden representations (e.g., data 110) based on the reconstructions (e.g., data 108 generated by the ML model B), the ML model B may be trained to generate better reconstructions (e.g., with respect to the "normal" of the training set by its goal of "tricking" the discriminative ML model C) based on the output of ML model C (e.g., data 402 indicating data inputs as being similar or different), and the ML model C may be trained based on its assessment of the input data item (e.g., data 106) to architecture 400 and the input data item's reconstruction (e.g., data 108 generated by the ML model B).

In some embodiments, multiple sets of prediction models may be arranged together to form a network of prediction model sets to facilitate recognition/detection of concepts or anomalies or to perform classification of a data item. In some embodiments, each of the prediction model sets may include two or more prediction models (e.g., ML models A and B of figures described herein), three or more prediction models (e.g., ML models A, B, and C of figures described herein), or other number of prediction models. Each prediction model set may take as input a data item (e.g., input to its ML model A), and provide a reconstruction of the data item (e.g., an output of its ML model B) or an indication of (i) similarities or differences between two or more data items (e.g., the input data item and its corresponding reconstruction), (ii) whether two data items are similar or different, (iii) whether an anomaly exists in a data item, (iv) whether a data item has a classification (or concept) corresponding to the "normal" of the training set, or (v) other information. In some embodiments, each prediction model set may be its own network of prediction models configured to recognize a data item as belonging to one or more of a subset of classifications (or having one or more of a subset of concepts) or as being or having an anomaly (e.g., an classification or a concept that does not belong in the subset of classifications or concepts), while the overall network of prediction model sets is configured to recognize the data item as belonging to or having one or more of an overall set of classifications/concepts (e.g., that includes all the subsets of classifications/concepts) or as being or having an anomaly with respect to all the known classifications/concepts of the overall set. Moreover, given that each network of prediction models need only be trained on a training set corresponding only to a subset of the classifications/concepts, the overall amount of training needed may be reduced (e.g., as compared to attempting to train one network of prediction models to accurately recognize the entire/overall set of classifications/concepts). For example, in many cases, as the number of classifications/concepts (on which a prediction model needs to be trained) increases, the amount of training that the prediction model needs can go up exponentially to maintain the same level of prediction accuracy.

Figure 7:
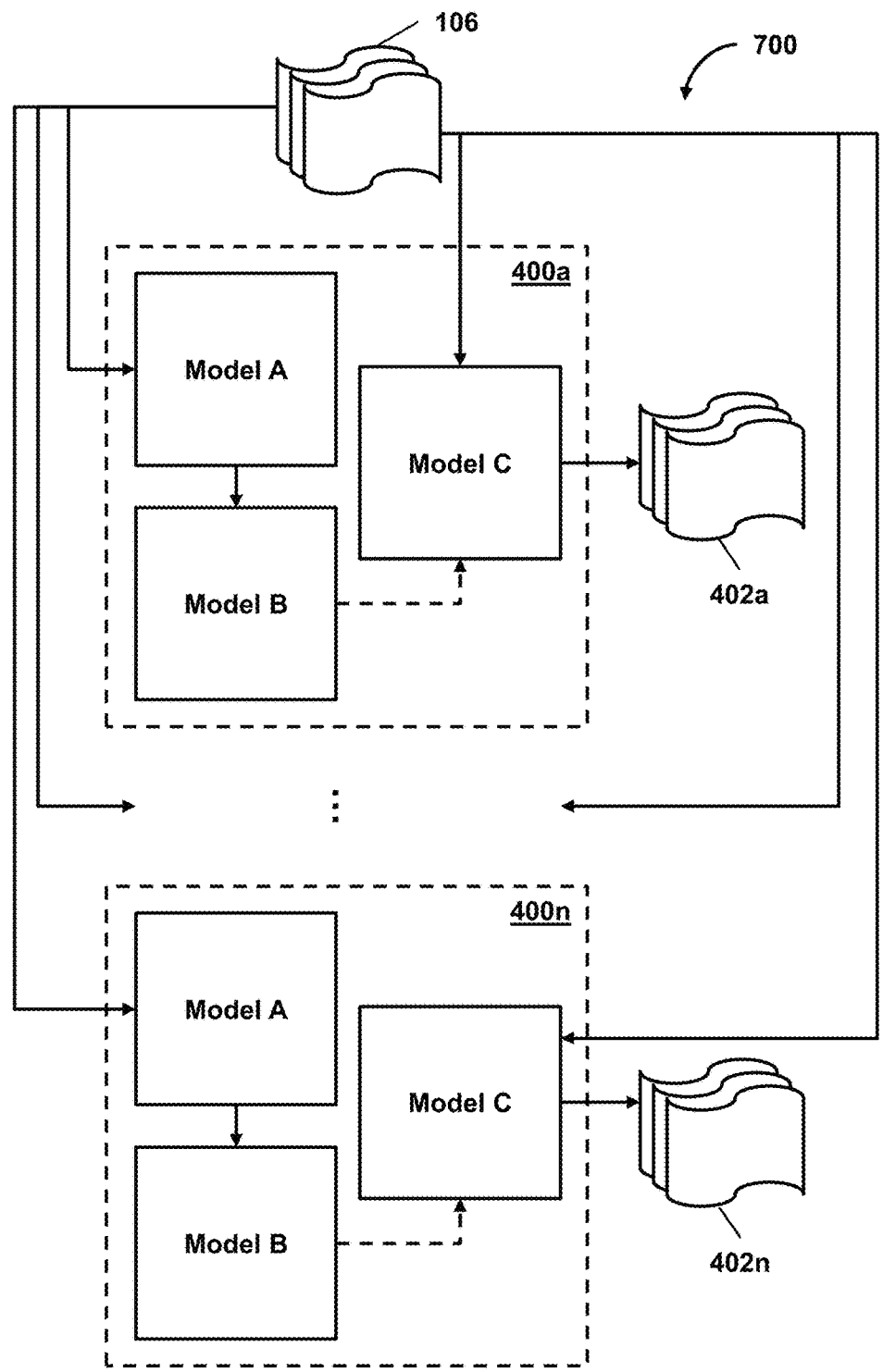
FIG. 7 show an architecture that includes multiple subsystems of machine learning models for recognition or detection of concepts or anomalies, in accordance with one or more embodiments.

As an example, with respect to FIG. 7, architecture 700 includes architecture 400a-400n, each with its own set of ML models A, B, and C. Although each of architecture 400a-400n may be provided with the same input (e.g., data 106), they each may provide a different output (e.g., outputs 402a-402n). In one use case, one of the architectures (e.g., architecture 400a) may be trained on a training set of brain scan images that are known to be of healthy brains (e.g., previously classified and confirmed as healthy brains), another one of the architectures may be trained on a training set of brain scan images that are known to have one or more types of tumors (e.g., previously classified and confirmed to have that a certain type of tumor), another one of the architectures may be trained on a training set of brain scan images that are known to have one or more instances of a stroke (e.g., previously classified and confirmed to have suffered from a stroke), and so one. When a set of brain scan images are provided as input to the overall architecture 700, each of the brain scan images are processed by each of the architectures 400. If a brain scan image is of a healthy brain, the architecture 400 trained on healthy brains will indicate that the brain scan image should be classified as a healthy brain. However, because the other architectures 400 were trained on diseased brains (e.g., tumor, stroke, etc.), each of the other architectures 400 will indicate that an anomaly exists with respect to the brain scan image. Likewise, if a brain scan image is of a brain with a certain type of tumor, the architecture 400 trained on brains with that type of tumor will indicate that the brain scan image should be classified as having a tumor (or having that certain type of tumor). Because the other architectures 400 were trained on other classifications/concepts, each of the other architectures 400 will indicate that an anomaly exists with respect to the brain scan image. In this way, even when an input data item does not correspond to any classification/concept on which one or more of the individual architecture 400 was trained, the overall architecture 700 may (i) still accurately identify the proper classification if at least one of the architectures 400 was trained on the classification/concepts corresponding to the input data item or (ii) cumulatively indicate that an anomaly exists with respect to the input data item.

In another use case, one of the architectures (e.g., architecture 400a) may be trained on a training set of accelerometer or other sensor data that are known to reflect an individual laying down, another one of the architectures may be trained on a training set of accelerometer or other sensor data that are known to reflect an individual walking, another one of the architectures may be trained on a training set of accelerometer or other sensor data that are known to reflect an individual jumping, another one of the architectures may be trained on a training set of accelerometer or other sensor data that are known to reflect an individual falling down, and so one. When a set of accelerometer or other sensor data are provided as input to the overall architecture 700, each of the accelerator/sensor data inputs are processed by each of the architectures 400. If an accelerator/sensor data input (e.g., from a wearable device worn by a patient or other individual) reflects an individual laying down (e.g., and none of the other training aspects), the architecture 400 trained on data reflecting individuals laying down will indicate that the input should be classified to reflect laying down. Because the other architectures 400 were trained other aspects that do not reflect laying down, each of the other architectures 400 will indicate that an anomaly exists with respect to the input. Likewise, if an accelerator/sensor data input (e.g., from a wearable device worn by a patient or other individual) reflects an individual falling down (e.g., and none of the other training aspects), the architecture 400 trained on data reflecting individuals falling down will indicate that the input should be classified to reflect falling down. Because the other architectures 400 were trained on other aspects that do not reflect falling down, each of the other architectures 400 will indicate that an anomaly exists with respect to the input.

Examples Flowcharts

Figure 8:
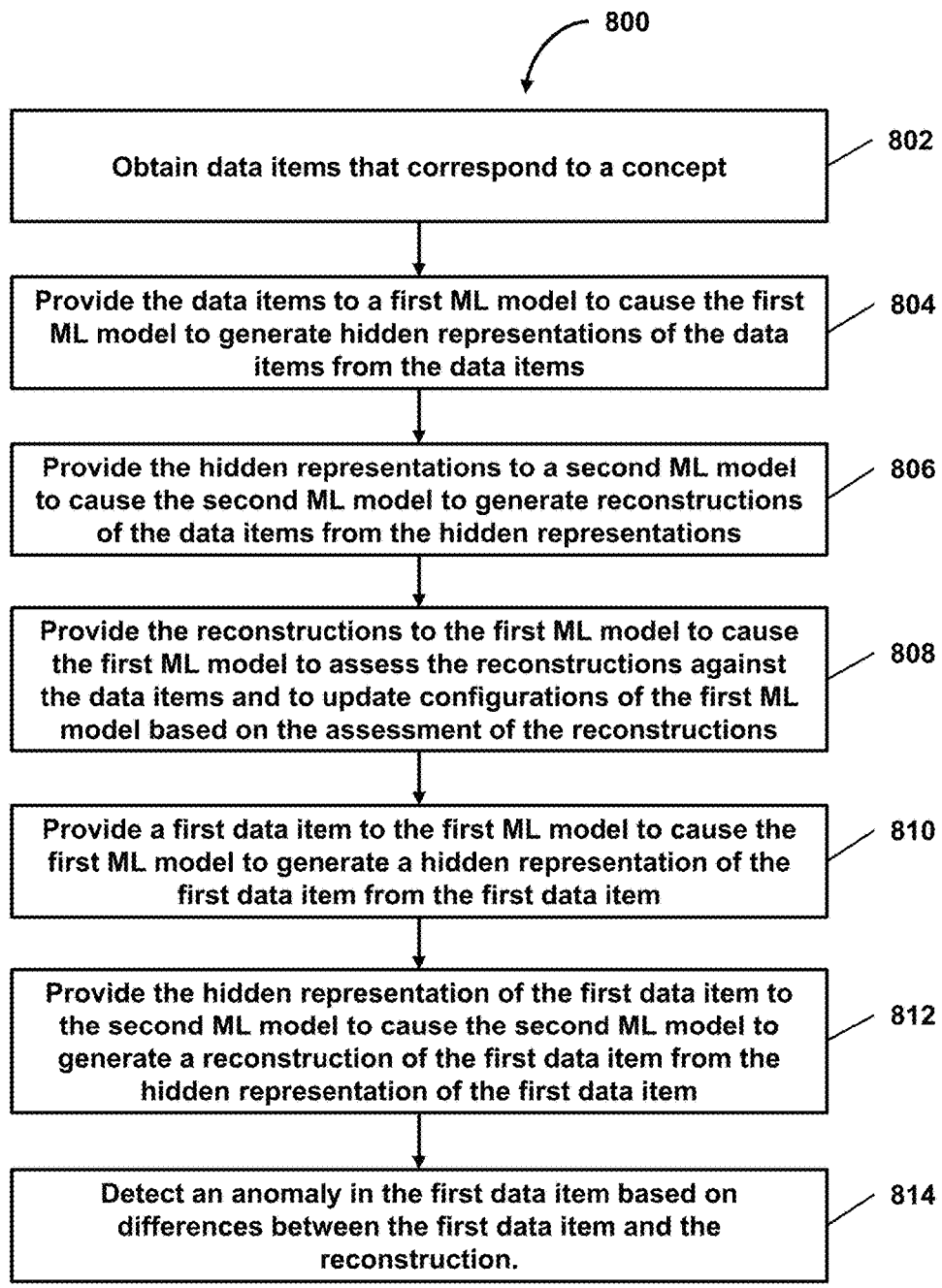
FIG. 8 shows a flowchart of a method of facilitating anomaly detection via a multi-ML-model architecture, in accordance with one or more embodiments.
Figure 9:
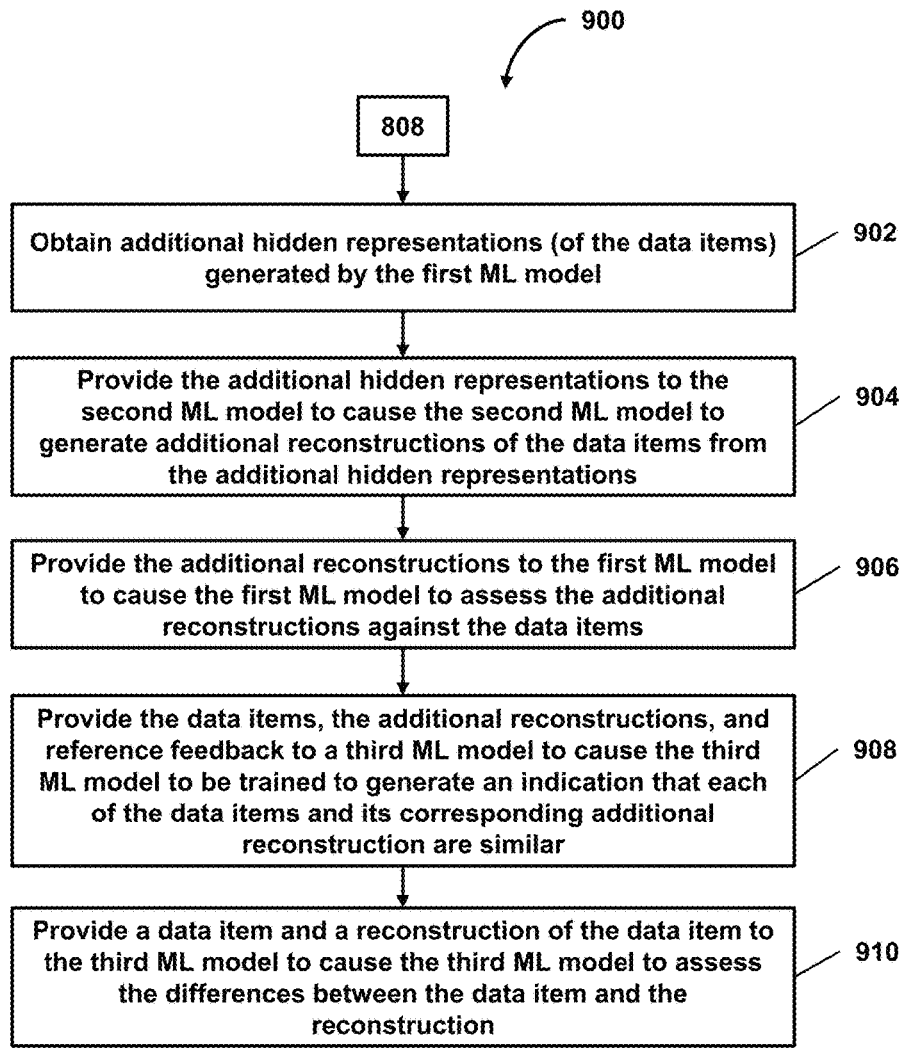
FIG. 9 shows a flowchart of a method of facilitating anomaly detection via a machine learning model trained to assess differences between a data item and its ML-model-derived reconstruction, in accordance with one or more embodiments.

FIGS. 8 and 9 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 8 shows a flowchart of a method of facilitating anomaly detection via a multi-ML-model architecture, in accordance with one or more embodiments. In an operation 802, data items that correspond to a concept may be obtained. As an example, the data items may include documents, audios, images, videos, sensor data recordings, or other data items. Such data items may include training data from one or more databases (e.g., training data databases 134), real-time streaming data, or other data. Operation 802 may be performed by a model subsystem that is the same as or similar to model subsystem 116, in accordance with one or more embodiments.

In an operation 804, the data items may be provided to a first machine learning model to cause the first machine learning model to generate hidden representations of the data items from the data items. As an example, the hidden representations may include compressed representations (e.g., lossy, lossless, etc.) of the data items, other representations having reduced resource sizes than their corresponding data items, or other hidden representations. In one use case, the first machine learning model may encode the input data (e.g., the data items) as vectors representing the data items (e.g., latent vectors representing the data items in a latent space). In a further use case, the first machine learning model may learn one or more generative algorithms to generate the hidden representations. The generative algorithms may be learned by the first machine learning model based on training on the data items, feedback from another machine learning model (e.g., as described herein) or other source (e.g., user-provided feedback), or other data. Operation 804 may be performed by a model subsystem that is the same as or similar to model subsystem 116, in accordance with one or more embodiments.

In an operation 806, the hidden representations of the data items may be provided to a second machine learning model to cause the second machine learning model to generate reconstructions of the data items from the hidden representations of the data items. In one use case, the second machine learning model may "decode" the input data (e.g., the hidden representations) to reconstruct a version of the data items. In a further use case, the second machine learning model may learn one or more generative algorithms to generate the reconstructions. The generative algorithms may be learned by the second machine learning model based on training on the hidden, feedback from another machine learning model (e.g., via generative adversarial network techniques) or other source (e.g., user-provided feedback), or other data. Operation 806 may be performed by a model subsystem that is the same as or similar to model subsystem 116, in accordance with one or more embodiments.

In an operation 808, the reconstructions of the data items may be provided to the first machine learning model to cause the first machine learning model to assess the reconstructions of the data items against the data items. Based on the assessment, the first machine learning model may update one or more configurations (e.g., representation-generation-related configurations) of the first machine learning model. As an example, the first machine learning model may adjust the weights of the first machine learning model based on the assessment of the reconstructions. The update/adjustment may, for instance, configure the first machine learning model to improve its generation of hidden representations in a way that causes the second machine learning model to generate more similar reconstructions of the data items corresponding to the hidden representations. As an example, the first machine learning model may learn (or continue to learn) one or more generative algorithms to improve its generation of hidden representations (e.g., by updating/adjusting the generative algorithms or parameters for such algorithms). Operation 808 may be performed by a feedback subsystem that is the same as or similar to feedback subsystem 118, in accordance with one or more embodiments.

In an operation 810, a first data item may be provided to the first machine learning model to cause the first machine learning model to generate a hidden representation of the first data item from the first data item. The first data item may include a document, audio, image, video, or other data item. The first data item may include training data from one or more databases (e.g., training data databases 134), real-time streaming data, or other data. As an example, the first machine learning model may encode the input data (e.g., the first data item) as one or more latent vectors representing the first data item (e.g., latent vectors representing the first data item in a latent space). Operation 810 may be performed by a model subsystem that is the same as or similar to model subsystem 116, in accordance with one or more embodiments.

In an operation 812, the hidden representation of the first data item may be provided to the second machine learning model to cause the second machine learning model to generate a reconstruction of the first data item from the hidden representation of the first data item. Operation 812 may be performed by a model subsystem that is the same as or similar to model subsystem 116, in accordance with one or more embodiments.

In an operation 814, an anomaly in the first data item may be detected based on differences between the first data item and the reconstruction of the first data item. Operation 814 may be performed by a detection subsystem that is the same as or similar to detection subsystem 120, in accordance with one or more embodiments.

FIG. 9 shows a flowchart of a method of facilitating anomaly detection via a machine learning model trained to assess differences between a data item and its ML-model-derived reconstruction, in accordance with one or more embodiments. As discussed above with respect to FIG. 8, a first machine learning model may generate hidden representations of data items (e.g., corresponding to a concept) from the data items, and a second machine learning model may generate reconstructions of the data items from the hidden representations of the data items. The first machine learning model may assess the reconstructions against the data items, and, based on the assessment, the first machine learning model may update one or more configurations (e.g., representation-generation-related configurations) of the first machine learning model. Such update may, for example, configure the first machine learning model to improve its generation of hidden representations in a way that causes the second machine learning model to generate more similar reconstructions of the data items corresponding to the hidden representations.

In an operation 902, subsequent to such an update, additional hidden representations (of the data items) generated by the first machine learning model may be obtained. As an example, the additional hidden representations may include compressed representations of the data items, other representations having reduced resource sizes than their corresponding data items, or other hidden representations. In one use case, the first machine learning model may encode the input data (e.g., the data items) as vectors representing the data items (e.g., latent vectors representing the data items in a latent space) based on one or more generative algorithms that it learned from prior processing of the data items (or other data items) and its assessments of feedback related to results of such processing or other aspects of such processing. Operation 904 may be performed by a model subsystem that is the same as or similar to model subsystem 116, in accordance with one or more embodiments.

In an operation 904, the additional hidden representations of the data items may be provided to the second machine learning model to cause the second machine learning model to generate additional reconstructions of the data items from the additional hidden representations of the data items. In one use case, the second machine learning model may "decode" the input data (e.g., the hidden representations) to reconstruct a version of the data items based on one or more generative algorithms that it learned from prior processing of hidden representations and its assessment of feedback related to results of such processing or other aspects of such processing. Operation 904 may be performed by a model subsystem that is the same as or similar to model subsystem 116, in accordance with one or more embodiments.

In an operation 906, the additional reconstructions of the data items may be provided to the first machine learning model to cause the first machine learning model to assess the additional reconstructions of the data items against the data items. Based on the assessment, the first machine learning model may update one or more configurations (e.g., representation-generation-related configurations) of the first machine learning model. As an example, the first machine learning model may adjust the weights of the first machine learning model based on the assessment of the additional reconstructions. The update/adjustment may, for instance, configure the first machine learning model to improve its generation of hidden representations (e.g., in a way that causes the second machine learning model to generate more similar reconstructions of the data items corresponding to the hidden representations). Operation 906 may be performed by a feedback subsystem that is the same as or similar to feedback subsystem 118, in accordance with one or more embodiments.

In an operation 908, the data items, the additional reconstructions of the data items, and given reference feedback may be provided to a third machine learning model to cause the third machine learning model to be trained based on the data items, the additional reconstructions of the data items, and the given reference feedback to generate an indication that each data item of the data items and the additional reconstruction corresponding to the data item are similar. As an example, the given reference feedback provided to the third machine learning model may include an indication that the data items and the additional reconstructions are similar. Based on the similarity indication feedback, the third machine learning model may process and reprocess a given data item and its corresponding reconstruction and update one or more configurations of the third machine learning model (e.g., on a periodic or other continuous basis) at least until the third machine learning model generates on its own the indication that the given data item and its corresponding reconstruction are similar (or sufficiently similar). The updating may, for example, configure the third machine learning model to improve its accuracy for detecting when a data item and its reconstruction are similar (and thus indicating that no anomaly is detected in the data item) (e.g., with respect to one or more given concepts that correspond to the data items used to train the third machine learning model). Operation 908 may be performed by a feedback subsystem that is the same as or similar to feedback subsystem 118, in accordance with one or more embodiments.

In an operation 910, a first data item and a reconstruction of first data item to the third machine learning model to cause the third machine learning model to assess the differences between the data item and the reconstruction of the data item. In one use case, as a result of its training, the third machine learning model generates an indication that the data item and the reconstruction of the data item are not similar if, for example, an anomaly exists in the data item with respect to one or more given concepts. On the other hand, as a result of its training, the third machine learning model generates an indication that the data item and the reconstruction are similar if, for example, no anomaly exists in the data item with respect to the given concepts. Operation 910 may be performed by a model subsystem that is the same as or similar to model subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database (s) 134, model database(s) 136, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 116-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 116-120 described herein is for illustrative purposes, and is not intended to be limiting, as any of subsystems 116-120 may provide more or less functionality than is described. For example, one or more of subsystems 116-120 may be eliminated, and some or all of its functionality may be provided by other ones of subsystems 116-120. As another example, additional subsystems may be programmed to perform some or all of the functionality attributed herein to one of subsystems 116-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining data items that corresponds to a concept; providing the data items to a first machine learning model to cause the first machine learning model to generate hidden representations of the data items from the data items; providing the hidden representations of the data items to a second machine learning model to cause the second machine learning model to generate reconstructions of the data items from the hidden representations of the data items; providing the reconstructions of the data items to the first machine learning model to cause the first machine learning model to assess the reconstructions of the data items against the data items, the first machine learning model updating one or more configurations of the first machine learning model based on the first machine learning model's assessment of the reconstructions of the data items.

2. The method of claim 1, further comprising: subsequent to providing the reconstructions of the data items, performing the following operations: providing a data item to the first machine learning model to cause the first machine learning model to generate a hidden representation of the data item from the data item; providing the hidden representation of the data item to the second machine learning model to cause the second machine learning model to generate a reconstruction of the data item from the hidden representation of the data item; and detecting an anomaly in the data item based on differences between the data item and the reconstruction of the data item.

3. The method of any of claims 1-2, wherein no output of the first machine learning model is provided as feedback to the second machine learning model.

4. The method of any of claims 2-3, further comprising, subsequent to providing the reconstructions of the data items: obtaining additional data items that corresponds to the concept; providing the additional data items to the first machine learning model to cause the first machine learning model to generate hidden representations of the additional data items from the additional data items; providing the hidden representations of the additional data items to the second machine learning model to cause the second machine learning model to generate reconstructions of the additional data items from the hidden representations of the additional data items; providing the additional data items, the reconstructions of the additional data items, and reference feedback to a third machine learning model to cause the third machine learning model to be trained based on the additional data items, the reconstructions of the additional data items, and the reference feedback to generate an indication that each additional data item of the additional data items and the reconstruction corresponding to the additional data item are similar; and providing the data item and the reconstruction of the data item to the third machine learning model to cause the third machine learning model to assess the differences between the data item and the reconstruction of the data item, the third machine learning model generating an indication that the data item and the reconstruction of the data item are not similar based on the differences between the data item and the reconstruction of the data item, wherein detecting the anomaly comprises detecting the anomaly in the data item based on the indication generated by the third machine learning model.

5. The method of any of claims 2-4, wherein the first machine learning model is configured to generate additional hidden representations of the data items from the data items subsequent to the updating of the first machine learning model, the method further comprising: providing the additional hidden representations of the data items to the second machine learning model to cause the second machine learning model to generate additional reconstructions of the data items from the additional hidden representations of the data items; and providing the additional reconstructions of the data items to the first machine learning model to cause the first machine learning model to assess the additional reconstructions of the data items against the data items, the first machine learning model further updating one or more configurations of the first machine learning model based on the first machine learning model's assessment of the additional reconstructions of the data items.

6. The method of claim 5, further comprising: providing the data items, the additional reconstructions of the data items, and reference feedback to a third machine learning model to cause the third machine learning model to be trained based on the data items, the additional reconstructions of the data items, and the reference feedback to generate an indication that each data item of the data items and the additional reconstruction corresponding to the data item are similar; and providing the data item and the reconstruction of the data item to the third machine learning model to cause the third machine learning model to assess the differences between the data item and the reconstruction of the data item, the third machine learning model generating an indication that the data item and the reconstruction of the data item are not similar based on the differences between the data item and the reconstruction of the data item, wherein detecting the anomaly comprises detecting the anomaly in the data item based on the indication generated by the third machine learning model.

7. The method of claim 6, wherein the third machine learning model generates one or more indications of which portions of the data item and the reconstruction of the data item are not similar, and wherein detecting the anomaly comprises detecting the anomaly in the data item based on the one or more indications generated by the third neural network.

8. The method of any of claims 6-7, wherein the third machine learning model generates one or more indications of which portions of the data item and the reconstruction of the data item are similar, and wherein detecting the anomaly comprises detecting the anomaly in the data item based on the one or more indications generated by the third machine learning model.

9. The method of any of claims 5-8, further comprising: determining pairs such that each of the pairs comprises one of the data items and the additional reconstruction of another one of the data items; providing the pairs to a third neural network to cause the third neural network to, with respect to each of the pairs, generate an indication of whether the corresponding data item and additional reconstruction of the pair are similar; providing given reference feedback to the third neural network to cause the third neural network to assess the generated indications against the given reference feedback, the given reference feedback indicating that the corresponding data item and additional reconstruction of each of the pairs are not similar, the third neural network updating one or more configurations of the third neural network based on the third neural network's assessment of the generated indications; and providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

10. The method of any of claims 1-9, further comprising: determining subsets of data items such that each of the data item subsets comprise at least two data items of the data items; providing the data item subsets to a third neural network to cause the third neural network to, with respect to each of the data item subsets, generate an indication of whether the two data items of the data item subset are similar; providing given reference feedback to the third neural network to cause the third neural network to assess the generated indications against the given reference feedback, the given reference feedback indicating that the two data items of each of the data item subsets are not similar, the third neural network updating one or more configurations of the third neural network based on the third neural network's assessment of the generated indications; and providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

11. The method of any of claims 2-10, further comprising: deemphasizing one or more of the differences between the data item and the reconstruction of the data item, wherein detecting the anomaly comprises detecting the anomaly in the data item based on the one or more deemphasized differences and one or more other ones of the differences between the data item and the reconstruction of the data item.

12. The method of any of claims 2-11, further comprising: emphasizing one or more of the differences between the data item and the reconstruction of the data item, wherein detecting the anomaly comprises detecting the anomaly in the data item based on the one or more emphasized differences and one or more other ones of the differences between the data item and the reconstruction of the data item.

13. The method of claim 2-12, further comprising, subsequent to providing the reconstructions of the data items: providing a second data item to the first machine learning model to cause the first machine learning model to generate a hidden representation of the second data item from the second data item; and providing the hidden representation of the second data item to the second machine learning model to cause the second machine learning model to generate a reconstruction of the second data item from the hidden representation of the second data item, wherein no anomaly is detected in the second data item based on differences between the second data item and the reconstruction of the data second item.

14. The method of any of claims 1-13, wherein the first and second machine learning models comprises first and second neural networks.

15. The method of any of claims 1-14, wherein the data items comprise documents, audios, images, videos, or sensor data recordings.

16. The method of any of claims 1-15, wherein the data items comprise volumetric scans, ultrasound images, MRI images, or x-ray images.

17. A system comprising: a first machine learning model configured to generate hidden representations of data items from the data items, the data items corresponding to a concept; a second machine learning model configured to generate reconstructions of the data items from the hidden representations of the data items; wherein the first machine learning model is configured to: assess the reconstructions of the data items against the data items; and update one or more configurations of the first machine learning model based on the assessment of the reconstructions of the data items; and wherein, subsequent the update of the first machine learning model, the first machine learning model is configured to generate a hidden representation of a data item from the data item; and wherein the second machine learning model is configured to generate a reconstruction of the data item from the hidden representation of the data item; and at least one processor configured to detect an anomaly in the data item based on differences between the data item and the reconstruction of the data item.

18. The system of claim 17, wherein, subsequent the update of the first machine learning model, the first machine learning model is configured to: generate additional hidden representations of the data items from the data items; wherein the second machine learning model is configured to generate additional reconstructions of the data items from the additional hidden representations of the data items; and wherein the first machine learning model is configured to: assess the additional reconstructions of the data items against the data items; and further update one or more configurations of the first machine learning model based on the assessment of the additional reconstructions of the data items.

19. The system of claim 18, further comprising: a third machine learning model configured to: update one or more configurations of the third machine learning model based on (i) the data items, (ii) the additional reconstructions of the data items, and (iii) reference feedback indicating that each data item of the data items and the additional reconstruction corresponding to the data item are similar; and generate an indication that the data item and the reconstruction of the data item are not similar based on differences between the data item and the reconstruction of the data item; and wherein detecting the anomaly comprises detecting the anomaly in the data item based on the indication generated by the third machine learning model.

20. The system of claim 19, wherein the third machine learning model is configured to generate one or more indications of which portions of the data item and the reconstruction of the data item are not similar, and wherein detecting the anomaly comprises detecting the anomaly in the data item based on the one or more indications generated by the third machine learning model.

21. The system of claim 19, wherein the third machine learning model generates one or more indications of which portions of the data item and the reconstruction of the data item are similar, and wherein detecting the anomaly comprises detecting the anomaly in the data item based on the one or more indications generated by the third machine learning model.

22. A tangible, non-transitory, machine-readable medium storing instructions that when executed by a data processing apparatus cause the data processing apparatus to perform operations comprising those of any of embodiments 1-16.

23. A system, comprising: one or more processors; and memory storing instructions that when executed by the processors cause the processors to effectuate operations comprising those of any of embodiments 1-16.

What is claimed is:

1. A method of facilitating anomaly detection via a multi-neural-network architecture, the method being implemented by a computer system that comprises one or more processors executing computer program instructions that, when executed, perform the method, the method comprising:
   obtaining data items that correspond to a concept;
   providing the data items to a first neural network to cause the first neural network to generate hidden representations of the data items from the data items;
   providing the hidden representations of the data items to a second neural network to cause the second neural network to generate reconstructions of the data items from the hidden representations of the data items;
   providing the reconstructions of the data items as reference feedback to the first neural network to cause the first neural network to assess the reconstructions of the data items against the data items, the first neural network updating one or more representation-generation-related configurations of the first neural network based on the first neural network's assessment of the reconstructions of the data items; and
   subsequent to providing the reconstructions of the data items, performing the following operations:
   providing a first data item to the first neural network to cause the first neural network to generate a hidden representation of the first data item from the first data item;
   providing the hidden representation of the first data item to the second neural network to cause the second neural network to generate a reconstruction of the first data item from the hidden representation of the first data item; and
   detecting an anomaly in the first data item based on differences between the first data item and the reconstruction of the first data item.

2. The method of claim 1, further comprising:
   subsequent to providing the reconstructions of the data items, performing the following operations:
   providing a second data item to the first neural network to cause the first neural network to generate a hidden representation of the second data item from the second data item; and
   providing the hidden representation of the second data item to the second neural network to cause the second neural network to generate a reconstruction of the second data item from the hidden representation of the second data item,
   wherein no anomaly is detected in the second data item based on differences between the second data item and the reconstruction of the second data item.

3. The method of claim 1, wherein no output of the first neural network is provided as reference feedback to the second neural network.

4. The method of claim 1, further comprising:
   subsequent to providing the reconstructions of the data items, performing the following operations:
   obtaining additional data items that correspond to the concept;
   providing the additional data items to the first neural network to cause the first neural network to generate hidden representations of the additional data items from the additional data items;
   providing the hidden representations of the additional data items to the second neural network to cause the second neural network to generate reconstructions of the additional data items from the hidden representations of the additional data items;
   providing the additional data items, the reconstructions of the additional data items, and given reference feedback to a third neural network to cause the third neural network to be trained based on the additional data items, the reconstructions of the additional data items, and the given reference feedback to generate an indication that each additional data item of the additional data items and the reconstruction corresponding to the additional data item are similar; and
   providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item,
   wherein detecting the anomaly comprises detecting the anomaly in the first data item based on the indication generated by the third neural network.

5. The method of claim 1, wherein the first neural network is configured to generate additional hidden representations of the data items from the data items subsequent to the updating of the first neural network, the method further comprising:

providing the additional hidden representations of the data items to the second neural network to cause the second neural network to generate additional reconstructions of the data items from the additional hidden representations of the data items; and providing the additional reconstructions of the data items as reference feedback to the first neural network to cause the first neural network to assess the additional reconstructions of the data items against the data items, the first neural network further updating one or more representation-generation-related configurations of the first neural network based on the first neural network's assessment of the additional reconstructions of the data items.

6. The method of claim 5, further comprising:

providing the data items, the additional reconstructions of the data items, and given reference feedback to a third neural network to cause the third neural network to be trained based on the data items, the additional reconstructions of the data items, and the given reference feedback to generate an indication that each data item of the data items and the additional reconstruction corresponding to the data item are similar; and providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

7. The method of claim 6, wherein the third neural network generates one or more indications of which portions of the first data item and the reconstruction of the first data item are not similar, and wherein detecting the anomaly comprises detecting the anomaly in the first data item based on the one or more indications generated by the third neural network.

8. The method of claim 7, wherein the third neural network generates one or more additional indications of which portions of the first data item and the reconstruction of the first data item are similar, and wherein detecting the anomaly comprises detecting the anomaly in the first data item based on the one or more indications and the one or more additional indications generated by the third neural network.

9. The method of claim 5, further comprising:

determining pairs such that each of the pairs comprises one of the data items and the additional reconstruction of another one of the data items;

providing the pairs to a third neural network to cause the third neural network to, with respect to each of the pairs, generate an indication of whether the corresponding data item and additional reconstruction of the pair are similar;

providing given reference feedback to the third neural network to cause the third neural network to assess the generated indications against the given reference feedback, the given reference feedback indicating that the corresponding data item and additional reconstruction of each of the pairs are not similar, the third neural network updating one or more configurations of the third neural network based on the third neural network's assessment of the generated indications; and providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

10. The method of claim 1, further comprising:

determining subsets of data items such that each of the data item subsets comprise at least two data items of the data items;

providing the data item subsets to a third neural network to cause the third neural network to, with respect to each of the data item subsets, generate an indication of whether the two data items of the data item subset are similar;

providing given reference feedback to the third neural network to cause the third neural network to assess the generated indications against the given reference feedback, the given reference feedback indicating that the two data items of each of the data item subsets are not similar, the third neural network updating one or more configurations of the third neural network based on the third neural network's assessment of the generated indications; and providing the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

11. The method of claim 1, further comprising:

deemphasizing one or more of the differences between the first data item and the reconstruction of the first data item, wherein detecting the anomaly comprises detecting the anomaly in the first data item based on the one or more deemphasized differences and one or more other ones of the differences between the first data item and the reconstruction of the first data item.

12. The method of claim 1, further comprising:

emphasizing one or more of the differences between the first data item and the reconstruction of the first data item, wherein detecting the anomaly comprises detecting the anomaly in the first data item based on the one or more emphasized differences and one or more other ones of the differences between the first data item and the reconstruction of the first data item.

13. The method of claim 1, further comprising:

deemphasizing one or more of the differences between the first data item and the reconstruction of the first data item; and emphasizing one or more other ones of the differences between the first data item and the reconstruction of the first data item, wherein detecting the anomaly comprises detecting the anomaly in the first data item based on the one or more deemphasized differences and the one or more emphasized differences.

14. A system comprising:

a computer system that comprises one or more processors executing computer program instructions that, when executed, cause the computer system to:

obtain data items that correspond to a concept;

provide the data items to a first neural network to cause the first neural network to generate hidden representations of the data items from the data items;

provide the hidden representations of the data items to a second neural network to cause the second neural network to generate reconstructions of the data items from the hidden representations of the data items;

provide the reconstructions of the data items as reference feedback to the first neural network to cause the first neural network to assess the reconstructions of the data items against the data items, the first neural network updating one or more representation-generation-related configurations of the first neural network based on the first neural network's assessment of the reconstructions of the data items; and subsequent to providing the reconstructions of the data items, perform the following operations:

providing a first data item to the first neural network to cause the first neural network to generate a hidden representation of the first data item from the first data item;

providing the hidden representation of the first data item to the second neural network to cause the second neural network to generate a reconstruction of the first data item from the hidden representation of the first data item; and detecting an anomaly in the first data item based on differences between the first data item and the reconstruction of the first data item.

15. The system of claim 14, wherein the first neural network is configured to generate additional hidden representations of the data items from the data items subsequent to the updating of the first neural network, wherein the computer system is caused to:

provide the additional hidden representations of the data items to the second neural network to cause the second neural network to generate additional reconstructions of the data items from the additional hidden representations of the data items; and provide the additional reconstructions of the data items as reference feedback to the first neural network to cause the first neural network to assess the additional reconstructions of the data items against the data items, the first neural network further updating one or more representation-generation-related configurations of the first neural network based on the first neural network's assessment of the additional reconstructions of the data items.

16. The system of claim 15, wherein the computer system is caused to:

provide the data items, the additional reconstructions of the data items, and given reference feedback to a third neural network to cause the third neural network to be trained based on the data items, the additional reconstructions of the data items, and the given reference feedback to generate an indication that each data item of the data items and the additional reconstruction corresponding to the data item are similar; and provide the first data item and the reconstruction of the first data item to the third neural network to cause the third neural network to assess the differences between the first data item and the reconstruction of the first data item, the third neural network generating an indication that the first data item and the reconstruction of the first data item are not similar based on the differences between the first data item and the reconstruction of the first data item, wherein detecting the anomaly comprises detecting the anomaly in the first data item based on the indication generated by the third neural network.

17. A system comprising:

a first neural network configured to generate hidden representations of data items from the data items, the data items corresponding to a concept;

a second neural network configured to generate reconstructions of the data items from the hidden representations of the data items;

wherein the first neural network is configured to:

assess the reconstructions of the data items against the data items; and update one or more representation-generation-related configurations of the first neural network based on the assessment of the reconstructions of the data items; and wherein, subsequent to the update of the first neural network, the first neural network is configured to generate a hidden representation of a first data item from the first data item; and wherein the second neural network is configured to generate a reconstruction of the first data item from the hidden representation of the first data item; and at least one processor configured to detect an anomaly in the first data item based on differences between the first data item and the reconstruction of the first data item.

18. The system of claim 17, wherein, subsequent the update of the first neural network, the first neural network is configured to: generate additional hidden representations of the data items from the data items;

wherein the second neural network is configured to generate additional reconstructions of the data items from the additional hidden representations of the data items; and wherein the first neural network is configured to:

assess the additional reconstructions of the data items against the data items; and further update one or more representation-generation-related configurations of the first neural network based on the assessment of the additional reconstructions of the data items.

19. The system of claim 18, further comprising:

a third neural network configured to:

update one or more configurations of the third neural network based on (i) the data items, (ii) the additional reconstructions of the data items, and (iii) reference feedback indicating that each data item of the data items and the additional reconstruction corresponding to the data item are similar; and generate an indication that the first data item and the reconstruction of the first data item are not similar based on differences between the first data item and the reconstruction of the first data item; and wherein detecting the anomaly comprises detecting the anomaly in the first data item based on the indication generated by the third neural network.

20. The system of claim 19, wherein the third neural network is configured to generate one or more indications of which portions of the first data item and the reconstruction of the first data item are not similar, and wherein detecting the anomaly comprises detecting the anomaly in the first data item based on the one or more indications generated by the third neural network.

* * * * *